United States Patent
Xu

(10) Patent No.: US 11,256,408 B2
(45) Date of Patent: Feb. 22, 2022

(54) TOUCH METHOD AND TERMINAL HAVING DYNAMICALLY ADJUSTABLE TIME THRESHOLD FOR TOUCH GESTURE RECOGNITION

(71) Applicant: HUAWEI TECHNOLOGIES CO., LTD., Shenzhen (CN)

(72) Inventor: Jie Xu, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/959,040

(22) PCT Filed: Dec. 28, 2017

(86) PCT No.: PCT/CN2017/119297
§ 371 (c)(1),
(2) Date: Jun. 29, 2020

(87) PCT Pub. No.: WO2019/127195
PCT Pub. Date: Jul. 4, 2019

(65) Prior Publication Data
US 2020/0341611 A1    Oct. 29, 2020

(51) Int. Cl.
*G06F 3/0488* (2013.01)
*G06F 3/01* (2006.01)
*G06F 3/04842* (2022.01)

(52) U.S. Cl.
CPC ............ *G06F 3/0488* (2013.01); *G06F 3/017* (2013.01); *G06F 3/04842* (2013.01)

(58) Field of Classification Search
CPC ........ G06F 3/017; G06F 3/041; G06F 3/0414; G06F 3/04186; G06F 3/048;
(Continued)

(56) References Cited

U.S. PATENT DOCUMENTS 8,786,560 B1    7/2014 Khafizov et al.
2006/0284858 A1* 12/2006 Rekimoto ............. G06F 3/0481
345/173
(Continued)

FOREIGN PATENT DOCUMENTS

CN    101853133 A    10/2010
CN    102004593 A    4/2011
(Continued)

OTHER PUBLICATIONS

Xiongchen 100, "How to experience the pressing function of iphone6s," total 8 pages (Sep. 19, 2016).

*Primary Examiner* — Richard J Hong
(74) *Attorney, Agent, or Firm* — Leydig, Voit & Mayer, Ltd.

(57) ABSTRACT

A touch-and-display method is provided. The method includes receiving a touch operation entered by a user on a touch object. The touch object is a control element supporting an area change gesture and a touch-and-hold gesture. An interface is displayed corresponding to the area change gesture based on a touch area applied to the touch object in the touch operation meeting a preset condition within a first time threshold, and reaches, within a second time threshold, an area threshold for recognizing the area change gesture. A different interface is displayed corresponding to the touch-and-hold gesture based on the touch area applied to the touch object in the touch operation meeting the preset condition within the first time threshold but not reaching the area threshold within the second time threshold. Therefore, the efficiency of the mobile device responding to the touch gesture is increased.

13 Claims, 28 Drawing Sheets

(58) Field of Classification Search
CPC ............... G06F 3/04817; G06F 3/0484; G06F 3/04842; G06F 3/0488; G06F 3/044; G06F 3/0418; G06F 3/0481; G06F 3/0485; G06F 3/016; G06F 3/16; G06F 3/04883

See application file for complete search history.

(56) References Cited

U.S. PATENT DOCUMENTS

| | | | |
|---|---|---|---|
| 2008/0024459 A1* | 1/2008 | Poupyrev | G06F 3/016 345/173 |
| 2009/0046110 A1* | 2/2009 | Sadler | G06F 3/0488 345/660 |
| 2011/0248948 A1* | 10/2011 | Griffin | G06F 3/0488 345/174 |
| 2012/0105367 A1* | 5/2012 | Son | G06F 3/04883 345/174 |
| 2015/0169125 A1 | 6/2015 | Ito et al. | |
| 2018/0039392 A1* | 2/2018 | Kim | G06F 3/044 |
| 2018/0059893 A1 | 3/2018 | Xu et al. | |
| 2018/0081493 A1* | 3/2018 | Wang | G06F 3/0418 |
| 2018/0335937 A1* | 11/2018 | Hauenstein | G06F 3/0485 |
| 2019/0212907 A1* | 7/2019 | Han | G06F 3/16 |
| 2021/0117079 A1* | 4/2021 | Hauenstein | G06F 3/016 |

FOREIGN PATENT DOCUMENTS

| | | |
|---|---|---|
| CN | 103135818 A | 6/2013 |
| CN | 105094593 A | 11/2015 |
| CN | 105468282 A | 4/2016 |
| CN | 105511784 A | 4/2016 |
| CN | 106547450 A | 3/2017 |
| CN | 106843559 A | 6/2017 |
| CN | 107111397 A | 8/2017 |
| WO | 2017113365 A1 | 7/2017 |
| WO | 2017156697 A1 | 9/2017 |

* cited by examiner

TOUCH METHOD AND TERMINAL HAVING DYNAMICALLY ADJUSTABLE TIME THRESHOLD FOR TOUCH GESTURE RECOGNITION

CROSS-REFERENCE TO RELATED APPLICATIONS

This application is a National Stage of International Application No. PCT/CN2017/119297, filed on Dec. 28, 2017, which is hereby incorporated by reference in its entirety.

TECHNICAL FIELD

This application relates to the field of communications technologies, and in particular, to a touch method and a terminal.

BACKGROUND

Currently, a terminal such as a mobile phone may recognize a plurality of touch gestures (for example, a pressure recognition gesture, a touch-and-hold gesture, and an area change gesture) entered by a user. In addition, for each touch gesture, the terminal triggers a corresponding shortcut function.

For example, as shown in FIG. 1, when a mobile phone detects that a location of a touch point of a user is on an icon of an application 11, and that a time of touching a screen of the mobile phone reaches a preset time threshold, the mobile phone may determine that the user enters a touch-and-hold gesture on the icon, and further trigger the mobile phone to display a shortcut menu 12 for uninstalling the application 11.

For another example, as shown in FIG. 2, when a mobile phone detects that a location of a touch point of a user is on an icon of an application 11, and that a pressure value of pressing a screen of the mobile phone reaches a preset pressure threshold, the mobile phone may determine that the user enters a pressure recognition gesture on the icon, and further trigger the mobile phone to display a shortcut menu 13 for jumping to a "write e-mail" function.

However, when the icon of the application 11 not only supports the touch-and-hold gesture entered by the user, but also supports the pressure recognition gesture entered by the user, if an operation of pressing the icon of the application 11 by the user is relatively slow, duration of touching the screen by a finger has reached the time threshold before a pressure value of pressing by the user reaches the pressure threshold. In this case, the mobile phone incorrectly determines that the touch gesture entered by the user as a touch-and-hold gesture. Therefore, efficiency of responding to the touch gesture by the mobile phone is reduced.

SUMMARY

Embodiments of this application provide a touch method and a terminal to reduce a probability of unintentional operations between a plurality of touch gestures and increase efficiency of responding to a touch gesture by a mobile phone.

To achieve the foregoing objective, the following technical solutions are used in the embodiments of this application:

According to a first aspect, an embodiment of this application provides a touch method, which may be applied to a terminal having a touchscreen, where the method specifically includes: receiving, by the terminal, a first touch operation entered by a user on a first touch object (the first touch object is a control element supporting a pressure recognition gesture and a touch-and-hold gesture), a pressure value applied to the first touch object in the first touch operation satisfies a first preset condition within a first time threshold and reaches, within a second time threshold (the second time threshold is greater than the first time threshold, and the second time threshold is greater than a time threshold for recognizing the touch-and-hold gesture by the terminal), a pressure threshold for recognizing the pressure recognition gesture; and displaying, by the terminal in response to the first touch operation, a first interface corresponding to the pressure recognition gesture.

In addition, the terminal may further receive a second touch operation entered by the user on the first touch object, where a pressure value applied to the first touch object in the second touch operation satisfies the first preset condition within the first time threshold but does not reach the pressure threshold within the second time threshold, or a pressure value applied to the first touch object in the second touch operation does not satisfy the first preset condition within the first time threshold; and the terminal displays, in response to the second touch operation, a second interface corresponding to the touch-and-hold gesture.

To be specific, in the touch method provided by this embodiment of this application, when the touch object operated by the user supports not only the touch-and-hold gesture, but also the pressure recognition gesture, the terminal may dynamically adjust the time threshold for recognizing the touch-and-hold gesture by the terminal, so that the terminal does not suffer interference from the touch-and-hold gesture when recognizing the pressure recognition gesture, to reduce a probability that the terminal incorrectly determines the pressure recognition gesture as the touch-and-hold gesture.

In an embodiment, after the receiving, by the terminal, a first touch operation entered by a user on a first touch object, and before the displaying, by the terminal, a first interface corresponding to the pressure recognition gesture, the method further includes: obtaining, by the terminal, the pressure value applied to the first touch object and touch duration; determining, by the terminal, that the pressure value satisfies the first preset condition within the first time threshold (the first time threshold is the time threshold for recognizing the touch-and-hold gesture by the terminal), which indicates that the user has an intention of performing the pressure recognition gesture within the first time threshold; and using, by the terminal, the second time threshold that has a relatively loose time limit as the time threshold for recognizing the touch-and-hold gesture, to avoid that the user has no sufficient time to correctly press the first touch object before the terminal recognizes the touch-and-hold gesture.

For example, that the pressure value satisfies the first preset condition includes: the applied pressure value falls within a preset first pressure range, where an upper limit of the first pressure range is less than the pressure threshold for recognizing the pressure recognition gesture, and a lower limit of the first pressure range is greater than 0; and/or an increase speed of the pressure value is greater than a preset speed threshold.

In an embodiment, the using, by the terminal, the second time threshold as the time threshold for recognizing the touch-and-hold gesture includes: pre-storing, by the terminal, a correspondence between the second time threshold and the pressure value, and using, by the terminal based on the correspondence, the second time threshold corresponding to the pressure value as the time threshold for recognizing the touch-and-hold gesture; or pre-storing, by the terminal, a function relationship between the second time threshold and the pressure value, and substituting, by the terminal, the pressure value into the function relationship to obtain the second time threshold, and using the second time threshold as the time threshold for recognizing the touch-and-hold gesture.

In an embodiment, after the using, by the terminal, the second time threshold as the time threshold for recognizing the touch-and-hold gesture, the method further includes: if determining that the pressure value satisfies a second preset condition within the second time threshold, using, by the terminal, a third time threshold that has a looser time limit as the time threshold for recognizing the touch-and-hold gesture (the third time threshold is greater than the second time threshold), where the second preset condition includes: the pressure value falls within a preset second pressure range, where an upper limit of the second pressure range is less than the pressure threshold for recognizing the pressure recognition gesture, and a lower limit of the second pressure range is greater than the upper limit of the first pressure range; and/or the increase speed of the pressure value is greater than the preset speed threshold.

In an embodiment, when the second time threshold is a maximum time threshold for recognizing the touch-and-hold gesture, if determining that the pressure value satisfies a second preset condition within the second time threshold, the terminal may still use the second time threshold as the time threshold for recognizing the touch-and-hold gesture. Certainly, when the second time threshold is the maximum time threshold for recognizing the touch-and-hold gesture, the terminal may not determine a relationship between the detected pressure value and the second preset condition either. In this case, regardless of the detected pressure value, the terminal may use the second time threshold as the time threshold for recognizing the touch-and-hold gesture.

According to a second aspect, an embodiment of this application provides a touch method, applied to a terminal having a touchscreen, where the method includes: receiving, by the terminal, a first touch operation entered by a user on a second touch object, where the second touch object is a control element supporting an area change gesture and a touch-and-hold gesture; displaying, by the terminal in response to the first touch operation, a first interface corresponding to the area change gesture; receiving, by the terminal, a second touch operation entered by the user on the second touch object; and displaying, by the terminal in response to the second touch operation, a second interface corresponding to the touch-and-hold gesture.

A touch area applied to the second touch object in the first touch operation satisfies a first preset condition within a first time threshold and reaches, within a second time threshold, an area threshold for recognizing the area change gesture, the second time threshold is greater than the first time threshold, and a touch area applied to the second touch object in the second touch operation satisfies the first preset condition within the first time threshold but does not reach the area threshold within the second time threshold, or a touch area applied to the second touch object in the second touch operation does not satisfy the first preset condition within the first time threshold.

To be specific, in the touch method provided by this embodiment of this application, when the touch object operated by the user supports not only the touch-and-hold gesture, but also the area change gesture, the terminal may dynamically adjust, based on the touch area of pressing the touchscreen, a time threshold for recognizing the touch-and-hold gesture by the terminal, so that the terminal does not suffer interference from the touch-and-hold gesture when recognizing the area change gesture, to reduce a probability that the terminal incorrectly determines the area change gesture as the touch-and-hold gesture.

In an embodiment, after the receiving, by the terminal, a first touch operation entered by a user on a second touch object, and after the displaying, by the terminal, a first interface corresponding to the area change gesture, the method further includes: obtaining, by the terminal, the touch area applied to the second touch object and touch duration; determining, by the terminal, that the touch area satisfies the first preset condition within the first time threshold (the first time threshold is the time threshold for recognizing the touch-and-hold gesture by the terminal), which indicates that the user has an intention of performing the area change gesture within the first time threshold; and using, by the terminal, the second time threshold that has a relatively loose time limit as the time threshold for recognizing the touch-and-hold gesture.

For example, the first preset condition includes: the touch area falls within a preset first area range, where an upper limit of the first area range is less than the area threshold for recognizing the area change gesture, and a lower limit of the first area range is greater than 0; and/or an increase speed of the touch area is greater than a preset speed threshold.

In an embodiment, the using, by the terminal, the second time threshold as the time threshold for recognizing the touch-and-hold gesture includes: pre-storing, by the terminal, a correspondence between the second time threshold and the touch area, and using, by the terminal based on the correspondence, the second time threshold corresponding to the touch area as the time threshold for recognizing the touch-and-hold gesture; or pre-storing, by the terminal, a function relationship between the second time threshold and the touch area, and substituting, by the terminal, the touch area into the function relationship to obtain the second time threshold, and using the second time threshold as the time threshold for recognizing the touch-and-hold gesture.

In an embodiment, after the using, by the terminal, the second time threshold as the time threshold for recognizing the touch-and-hold gesture, the method further includes: if determining that the touch area satisfies a second preset condition within the second time threshold, using, by the terminal, a third time threshold as the time threshold for recognizing the touch-and-hold gesture, where the third time threshold is greater than the second time threshold, where the second preset condition includes: the touch area falls within a preset second area range, where an upper limit of the second area range is less than the area threshold for recognizing the area change gesture, and a lower limit of the second area range is greater than the upper limit of the first area range; and/or the increase speed of the touch area is greater than the preset speed threshold.

In an embodiment, when the second time threshold is a maximum time threshold for recognizing the touch-and-hold gesture, if the terminal determines that the touch area satisfies a second preset condition within the second time threshold, the terminal still uses the second time threshold as the time threshold for recognizing the touch-and-hold gesture. Certainly, when the second time threshold is the maximum time threshold for recognizing the touch-and-hold gesture, the terminal may not determine a relationship between the detected touch area and the second preset condition either. In this case, regardless of a value of the detected touch area, the terminal may use the second time threshold as the time threshold for recognizing the touch-and-hold gesture.

According to a third aspect, an embodiment of this application provides a touch method, applied to a terminal having a touchscreen, where the method includes: receiving, by the terminal, a first touch operation entered by a user on a third touch object, where the third touch object is a control element supporting a pressure recognition gesture, an area change gesture, and a touch-and-hold gesture; displaying, by the terminal in response to the first touch operation, a first interface corresponding to the pressure recognition gesture; receiving, by the terminal, a second touch operation entered by the user on the third touch object; and displaying, by the terminal in response to the second touch operation, a second interface corresponding to the area change gesture.

A pressure value applied to the third touch object in the first touch operation first satisfies a preset condition within a first time threshold and reaches, within a second time threshold, a pressure threshold for recognizing the pressure recognition gesture, the second time threshold is greater than the first time threshold, and a touch area applied to the third touch object in the second touch operation first satisfies a preset condition within the first time threshold and reaches, within the second time threshold, an area threshold for recognizing the area change gesture.

To be specific, in the touch method provided by this embodiment of this application, when the touch object operated by the user supports not only the touch-and-hold gesture, but also the pressure recognition gesture and the area change gesture, the terminal may recognize, based on the pressure value and the touch area applied to the third touch object, the user's intention of performing the pressure recognition gesture or the area change gesture, and dynamically adjust a time threshold for recognizing the touch-and-hold gesture by the terminal, so that the terminal does not suffer interference from the touch-and-hold gesture when recognizing the pressure recognition gesture (or the area change gesture), to reduce a probability that the terminal incorrectly determines the pressure recognition gesture (or the area change gesture) as the touch-and-hold gesture.

In an embodiment, the method further includes: obtaining, by the terminal, the pressure value and the touch area applied to the third touch object and touch duration; determining, by the terminal, that the pressure value or the touch area first satisfies the preset condition within the first time threshold, where the first time threshold is the time threshold for recognizing the touch-and-hold gesture by the terminal; and using, by the terminal, the second time threshold as the time threshold for recognizing the touch-and-hold gesture.

In an embodiment, the method further includes: receiving, by the terminal, a third touch operation entered by the user on the third touch object; and displaying, by the terminal in response to the third touch operation, a third interface corresponding to the touch-and-hold gesture, where neither a pressure value nor a touch area applied to the third touch object in the third touch operation satisfies the preset condition within the first time threshold.

According to a fourth aspect, an embodiment of this application provides a touch method, applied to a terminal having a touchscreen, where the method includes: receiving, by the terminal, a first touch operation entered by a user on a fourth touch object, where the fourth touch object is a control element supporting an area change gesture and a pressure recognition gesture; displaying, by the terminal in response to the first touch operation, a first interface corresponding to the area change gesture; receiving, by the terminal, a second touch operation entered by the user on the fourth touch object; and displaying, by the terminal in response to the second touch operation, a second interface corresponding to the pressure recognition gesture.

A touch area applied to the fourth touch object in the first touch operation satisfies a first preset condition within a first pressure threshold and reaches, within a second pressure threshold, an area threshold for recognizing the area change gesture, the second pressure threshold is greater than the first pressure threshold, and a touch area applied to the fourth touch object in the second touch operation satisfies the first preset condition within the first pressure threshold but does not reach the area threshold within the second pressure threshold, or a touch area applied to the fourth touch object in the second touch operation does not satisfy the first preset condition within the first pressure threshold.

To be specific, in the touch method provided by this embodiment of this application, when the touch object operated by the user supports not only the pressure recognition gesture, but also the area change gesture, the terminal may dynamically adjust, based on the touch area of pressing the touchscreen, a pressure threshold for recognizing the pressure recognition gesture by the terminal, so that the terminal does not suffer interference from the pressure recognition gesture when recognizing the area change gesture, to reduce a probability that the terminal incorrectly determines the area change gesture as the pressure recognition gesture.

In an embodiment, after the receiving, by the terminal, a first touch operation entered by a user on a fourth touch object, and before the displaying, by the terminal, a first interface corresponding to the area change gesture, the method further includes: obtaining, by the terminal, the pressure value and the touch area applied to the fourth touch object; determining, by the terminal, that the touch area satisfies the first preset condition within the first pressure threshold, where the first pressure threshold is the pressure threshold for recognizing the pressure recognition gesture by the terminal; and using, by the terminal, the second pressure threshold as the pressure threshold for recognizing the pressure recognition gesture.

In an embodiment, the first preset condition includes: the touch area falls within a preset first area range, where an upper limit of the first area range is less than the area threshold for recognizing the area change gesture, and a lower limit of the first area range is greater than 0; and/or an increase speed of the touch area is greater than a preset speed threshold.

In an embodiment, the using, by the terminal, the second pressure threshold as the pressure threshold for recognizing the pressure recognition gesture includes: pre-storing, by the terminal, a correspondence between the second pressure threshold and the touch area, and using, by the terminal based on the correspondence, the second pressure threshold corresponding to the touch area as the time threshold for recognizing the pressure recognition gesture; or pre-storing, by the terminal, a function relationship between the second pressure threshold and the touch area, and substituting, by the terminal, the touch area into the function relationship to obtain the second pressure threshold, and using the second pressure threshold as the time threshold for recognizing the pressure recognition gesture.

In an embodiment, after the using, by the terminal, the second pressure threshold as the pressure threshold for recognizing the pressure recognition gesture, the method further includes: if determining that the touch area satisfies a second preset condition within the second pressure threshold, using, by the terminal, a third pressure threshold as the pressure threshold for recognizing the pressure recognition gesture, where the third pressure threshold is greater than the second pressure threshold, where the second preset condition includes: the touch area falls within a preset second area range, where an upper limit of the second area range is less than the area threshold for recognizing the area change gesture, and a lower limit of the second area range is greater than the upper limit of the first area range; and/or the increase speed of the touch area is greater than the preset speed threshold.

In an embodiment, when the second pressure threshold is a maximum pressure threshold for recognizing the pressure recognition gesture, if the terminal determines that the touch area satisfies a second preset condition within the second pressure threshold, the terminal still uses the second pressure threshold as the pressure threshold for recognizing the pressure recognition gesture. Certainly, when the second pressure threshold is the maximum pressure threshold for recognizing the pressure recognition gesture, the terminal may not determine a relationship between the detected touch area and the second preset condition. In this case, regardless of a value of the detected touch area, the terminal may use the second pressure threshold as the pressure threshold for recognizing the pressure recognition gesture.

According to a fifth aspect, an embodiment of this application provides a terminal, including an obtaining unit, configured to: receive a first touch operation entered by a user on a first touch object, where the first touch object is a control element supporting a pressure recognition gesture and a touch-and-hold gesture; and receive a second touch operation entered by the user on the first touch object; a processing unit, configured to: determine, in response to the first touch operation, that a pressure value applied to the first touch object in the first touch operation satisfies a first preset condition within a first time threshold and reaches, within a second time threshold, a pressure threshold for recognizing the pressure recognition gesture, and instruct a display unit to display a first interface corresponding to the pressure recognition gesture; and determine, in response to the second touch operation, that a pressure value applied to the first touch object in the second touch operation satisfies the first preset condition within the first time threshold but does not reach the pressure threshold within the second time threshold, and instruct the display unit to display a second interface corresponding to the touch-and-hold gesture, where the second time threshold is greater than the first time threshold, and the second time threshold is greater than a time threshold for recognizing the touch-and-hold gesture by the terminal; and the display unit, configured to display the first interface corresponding to the pressure recognition gesture, and display the second interface corresponding to the touch-and-hold gesture.

In an embodiment, the obtaining unit is further configured to obtain the pressure value applied to the first touch object and touch duration; and the processing unit is further configured to: determine that the pressure value satisfies the first preset condition within the first time threshold, where the first time threshold is the time threshold for recognizing the touch-and-hold gesture by the terminal; and use the second time threshold as the time threshold for recognizing the touch-and-hold gesture.

In an embodiment, the terminal pre-stores a correspondence between the second time threshold and the pressure value, and the processing unit is specifically configured to use, based on the correspondence, the second time threshold corresponding to the pressure value as the time threshold for recognizing the touch-and-hold gesture; or the terminal pre-stores a function relationship between the second time threshold and the pressure value, and the processing unit is specifically configured to substitute the pressure value into the function relationship to obtain the second time threshold, and use the second time threshold as the time threshold for recognizing the touch-and-hold gesture.

In an embodiment, the processing unit is further configured to: determine that the pressure value satisfies a second preset condition within the second time threshold; and use a third time threshold as the time threshold for recognizing the touch-and-hold gesture, where the third time threshold is greater than the second time threshold.

In an embodiment, the second time threshold is a maximum time threshold for recognizing the touch-and-hold gesture; and the processing unit is further configured to still use the second time threshold as the time threshold for recognizing the touch-and-hold gesture.

According to a sixth aspect, an embodiment of this application provides a terminal, including an obtaining unit, configured to: receive a first touch operation entered by a user on a second touch object, where the second touch object is a control element supporting an area change gesture and a touch-and-hold gesture; and receive a second touch operation entered by the user on the second touch object; a processing unit, configured to: determine, in response to the first touch operation, that a touch area applied to the second touch object in the first touch operation satisfies a first preset condition within a first time threshold and reaches, within a second time threshold, an area threshold for recognizing the area change gesture, and instruct a display unit to display a first interface corresponding to the area change gesture; and determine, in response to the second touch operation, that a touch area applied to the second touch object in the second touch operation satisfies the first preset condition within the first time threshold but does not reach the area threshold within the second time threshold, and instruct the display unit to display a second interface corresponding to the touch-and-hold gesture, where the second time threshold is greater than the first time threshold, and the second time threshold is greater than a time threshold for recognizing the touch-and-hold gesture by the terminal; and the display unit, configured to display the first interface corresponding to the area change gesture, and display the second interface corresponding to the touch-and-hold gesture.

In an embodiment, the obtaining unit is further configured to obtain the touch area applied to the second touch object and touch duration; and the processing unit is configured to: determine that the touch area satisfies the first preset condition within the first time threshold, where the first time threshold is the time threshold for recognizing the touch-and-hold gesture by the terminal; and use the second time threshold as the time threshold for recognizing the touch-and-hold gesture.

In an embodiment, the terminal pre-stores a correspondence between the second time threshold and the touch area, and the processing unit is specifically configured to use, based on the correspondence, the second time threshold corresponding to the touch area as the time threshold for recognizing the touch-and-hold gesture; or the terminal pre-stores a function relationship between the second time threshold and the touch area, and the processing unit is specifically configured to substitute the touch area into the function relationship to obtain the second time threshold, and use the second time threshold as the time threshold for recognizing the touch-and-hold gesture.

In an embodiment, the processing unit is further configured to: determine that the touch area satisfies a second preset condition within the second time threshold; and use a third time threshold as the time threshold for recognizing the touch-and-hold gesture, where the third time threshold is greater than the second time threshold.

In an embodiment, the second time threshold is a maximum time threshold for recognizing the touch-and-hold gesture; and the processing unit is further configured to still use the second time threshold as the time threshold for recognizing the touch-and-hold gesture.

According to a seventh aspect, an embodiment of this application provides a terminal, including an obtaining unit, configured to: receive a first touch operation entered by a user on a third touch object, where the third touch object is a control element supporting a pressure recognition gesture, an area change gesture, and a touch-and-hold gesture; and receive a second touch operation entered by the user on the third touch object; a processing unit, configured to: determine, in response to the first touch operation, that a pressure value applied to the third touch object in the first touch operation first satisfies a preset condition within a first time threshold and reaches, within a second time threshold, a pressure threshold for recognizing the pressure recognition gesture, and instruct a display unit to display a first interface corresponding to the pressure recognition gesture; and determine, in response to the second touch operation, that a touch area applied to the third touch object in the second touch operation first satisfies a preset condition within the first time threshold and reaches, within the second time threshold, an area threshold for recognizing the area change gesture, and instruct the display unit to display a second interface corresponding to the area change gesture, where the second time threshold is greater than the first time threshold, and the second time threshold is greater than a time threshold for recognizing the touch-and-hold gesture by the terminal; and the display unit, configured to display the first interface corresponding to the pressure recognition gesture, and display the second interface corresponding to the area change gesture.

In an embodiment, the obtaining unit is further configured to obtain the pressure value and the touch area applied to the third touch object and touch duration; and the processing unit is configured to: determine that the pressure value or the touch area first satisfies the preset condition within the first time threshold, where the first time threshold is the time threshold for recognizing the touch-and-hold gesture by the terminal; and use the second time threshold as the time threshold for recognizing the touch-and-hold gesture.

In an embodiment, the obtaining unit is further configured to receive a third touch operation entered by the user on the third touch object; and the display unit is further configured to display a third interface corresponding to the touch-and-hold gesture, where neither a pressure value nor a touch area applied to the third touch object in the third touch operation satisfies the preset condition within the first time threshold.

According to an eighth aspect, an embodiment of this application provides a terminal, including an obtaining unit, configured to: receive a first touch operation entered by a user on a fourth touch object, where the fourth touch object is a control element supporting an area change gesture and a pressure recognition gesture; and receive a second touch operation entered by the user on the fourth touch object; a processing unit, configured to: determine, in response to the first touch operation, that a touch area applied to the fourth touch object in the first touch operation satisfies a first preset condition within a first pressure threshold and reaches, within a second pressure threshold, an area threshold for recognizing the area change gesture, where the second pressure threshold is greater than the first pressure threshold, and instruct a display unit to display a first interface corresponding to the pressure recognition gesture; and determine, in response to the second touch operation, that a touch area applied to the second touch object in the second touch operation satisfies the first preset condition within the first pressure threshold but does not reach the area threshold within the second pressure threshold, and instruct the display unit to display a second interface corresponding to the area change gesture, where the second time threshold is greater than the first time threshold, and the second time threshold is greater than a time threshold for recognizing the touch-and-hold gesture by the terminal; and the display unit, configured to display the first interface corresponding to the area change gesture, and display the second interface corresponding to the pressure recognition gesture.

According to a ninth aspect, an embodiment of this application provides a terminal, including a processor, a memory, a bus, and a communications interface, where the memory is configured to store a computer-executable instruction, the processor is connected to the memory by using the bus, and when the terminal runs, the processor executes the computer-executable instruction stored in the memory, so that the terminal performs any one of the foregoing touch methods.

According to a tenth aspect, an embodiment of this application provides a chip, including a processor and a memory, where the memory is configured to store a computer-executable instruction, the processor is connected to the memory, and when the chip runs, the processor executes the computer-executable instruction stored in the memory, so that the chip performs any one of the foregoing touch methods.

According to an eleventh aspect, an embodiment of this application provides a computer-readable storage medium, where the computer-readable storage medium stores an instruction, and when the instruction is run on any one of the foregoing terminals, the terminal is enabled to perform any one of the foregoing touch methods.

According to a twelfth aspect, an embodiment of this application provides a computer program product including an instruction, where when the computer program product is run on any one of the terminals, the terminal is enabled to perform any one of the touch methods.

In the embodiments of this application, names of the components of the terminal do not constitute a limitation to the device. In actual implementation, the components may appear with other names. The components shall fall within the scope of the claims of this application and equivalent technologies thereof so long as functions of the components are similar to those in the embodiments of this application.

In addition, for a technical effect brought by embodiments in the second aspect to the twelfth aspect, refer to technical effects brought by embodiments+ in the first aspect. Details are not described again herein.

DESCRIPTION OF EMBODIMENTS

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of the embodiments of this application, unless otherwise stated, "multiple" means two or more than two.

A touch method provided by an embodiment of this application may be applied to any terminal having social application, for example, a mobile phone, a tablet computer, a wearable device, a vehicle mounted device, an augmented reality (AR) or virtual reality (VR) device, a notebook computer, an ultra-mobile personal computer (UMPC), a netbook, or a personal digital assistant (PDA). This is not limited in this embodiment of this application.

Figure 1:
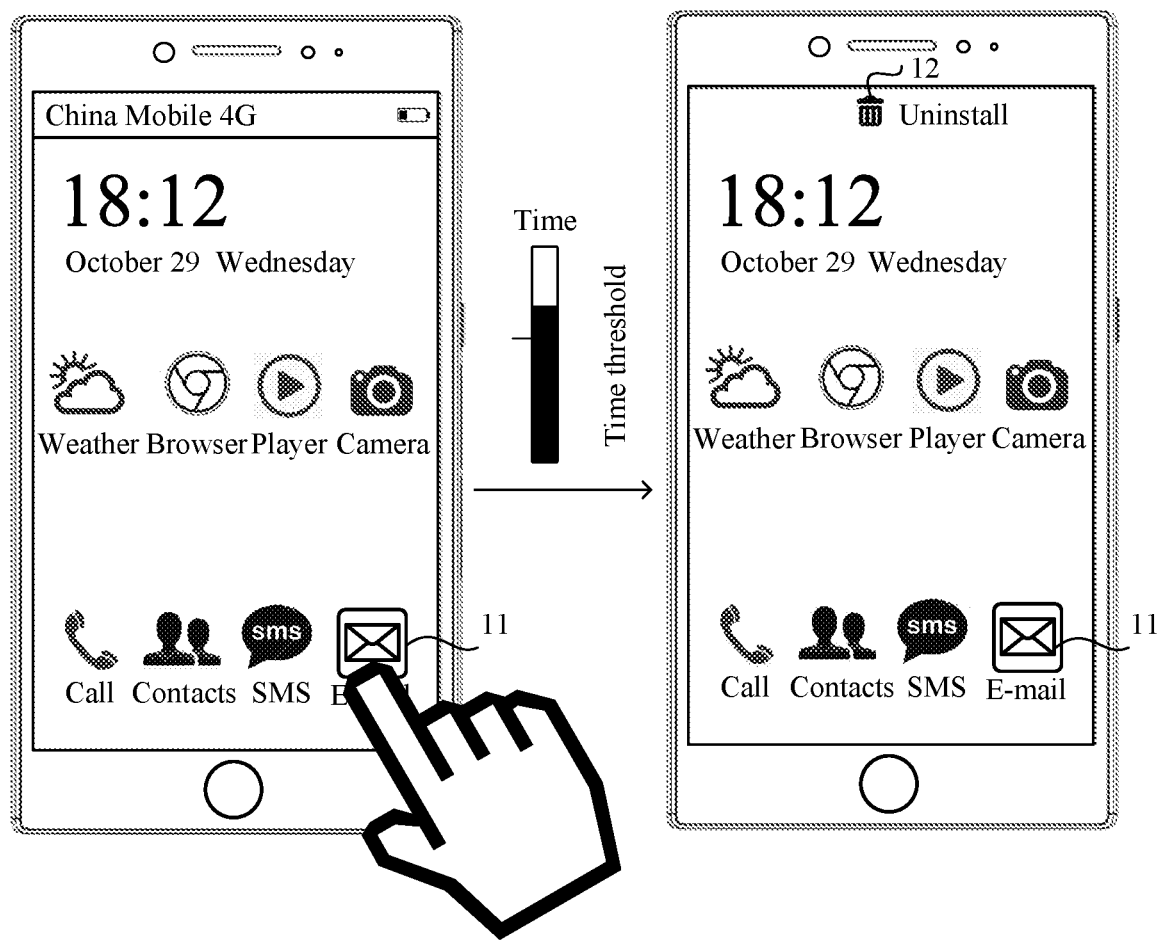
FIG. 1 is a schematic diagram of an application scenario of a touch-and-hold gesture in the prior art.
Figure 2:
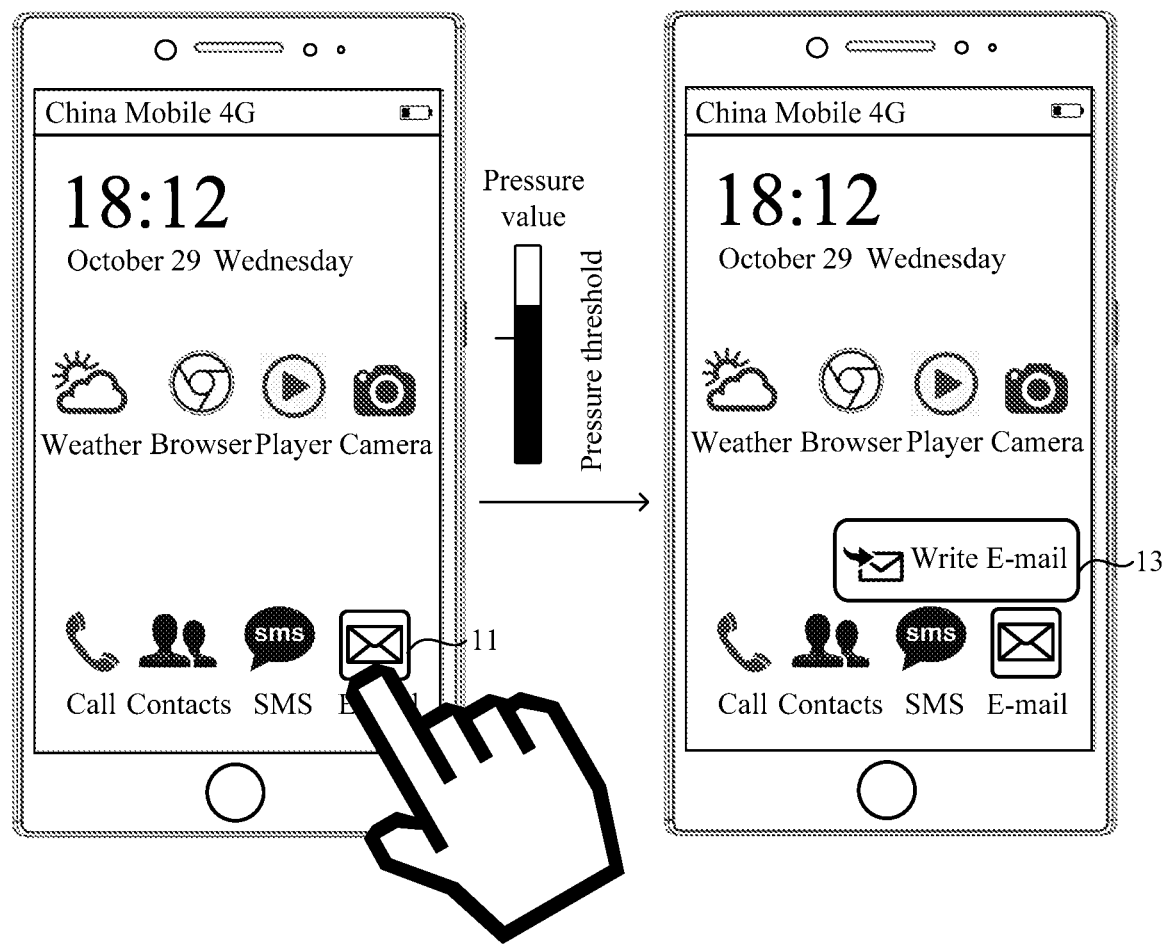
FIG. 2 is a schematic diagram of an application scenario of a pressure recognition gesture in the prior art.
Figure 3:
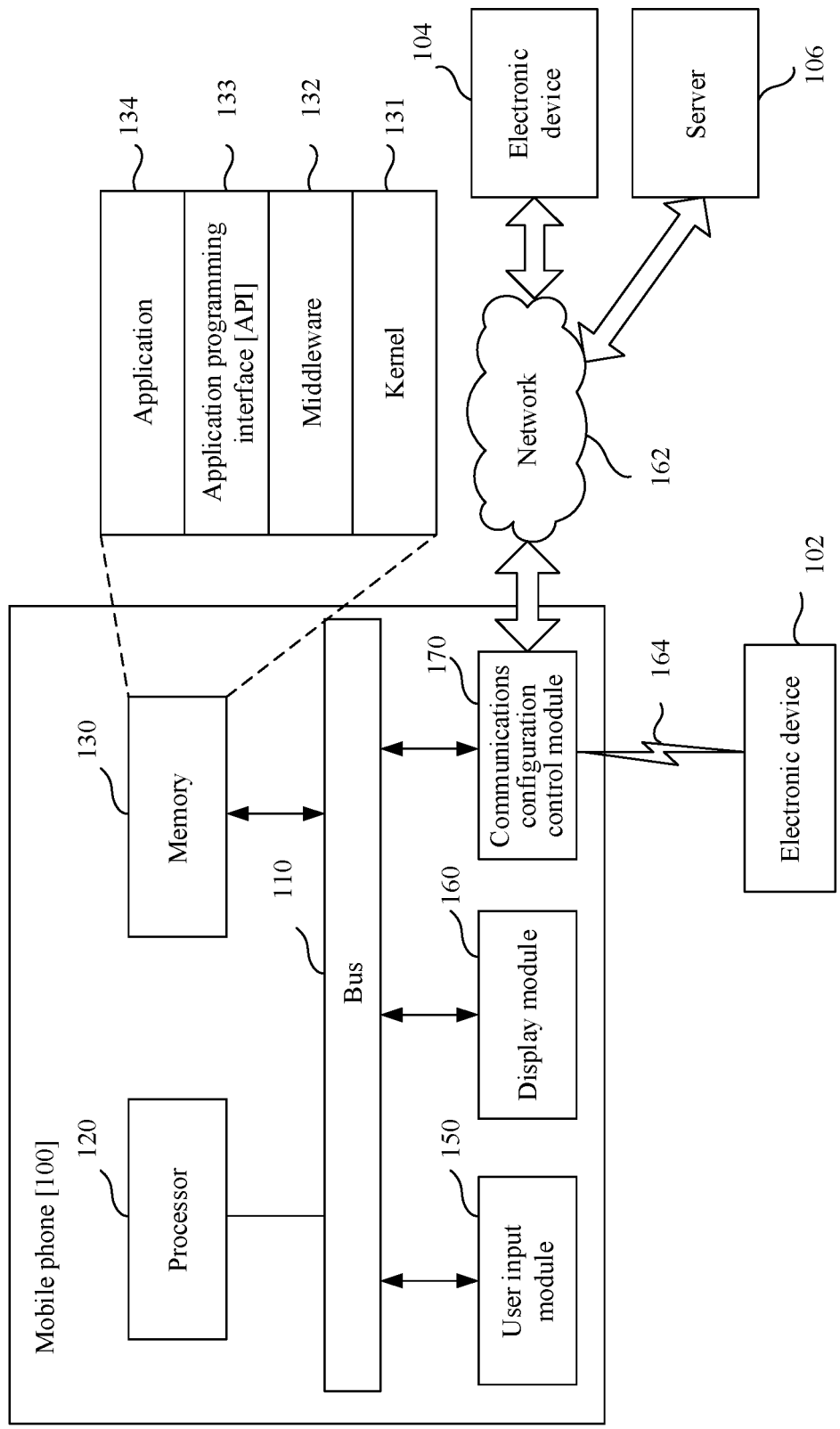
FIG. 3 is a schematic structural diagram 1 of a terminal according to an embodiment of this application.

As shown in FIG. 3, the terminal in this embodiment of this application may be a mobile phone 100. The following describes this embodiment in detail by using the mobile phone 100 as an example. It should be understood that, the mobile phone 100 shown in the figure is merely an example of the terminal. In addition, a quantity of components of the mobile phone 100 may be greater than or less than that shown in FIG. 3, or two or more components may be combined, or component configurations may be different.

Referring to FIG. 3, the mobile phone 100 may communicate with a server 106 and electronic devices 102 and 104 other than the mobile phone 100. The mobile phone 100 may include a bus 110, a processor 120, a memory 130, a user input module 150, a display module 160, a communications interface 170, and other similar and/or appropriate components.

The bus 110 may be a circuit interconnecting the foregoing components and transferring communication (for example, a control message) between the foregoing components.

The processor 120 may receive a command from another component (for example, the memory 130, the user input module 150, the display module 160, the communications interface 170, or the communications configuration control module 170) by using the bus 110, may interpret the received command, and may perform calculation or data processing based on the interpreted command.

The memory 130 may store a command or data received from the processor 120 or another component (for example, the user input module 150, the display module 160, or the communications interface 170), or a command or data generated by the processor 120 or another component.

The memory 130 may include programming modules, such as a kernel 131, middleware 132, an application programming interface (API) 133, and an application 134. Each of the foregoing programming modules may be implemented by software, firmware, hardware, or a combination of two or more thereof. For detailed descriptions, refer to descriptions related to FIG. 4.

The kernel 131 may control or manage a system resource (for example, the bus 110, the processor 120, the memory 130, or the like) for performing an operation or a function implemented by another programming module (for example, the middleware 132, the API 133, and the application 134). In addition, the kernel 131 may provide an interface that can access and control or manage each component of the mobile phone 100 by using the middleware 132, the API 133, or the application 134.

The middleware 132 runs between the API 133 or the application 134 and the kernel 131, so that the API 133 or the application 134 can communicate with the kernel 131 and exchange data with the kernel 131. For example, the middleware 132 may be configured as an intermediary for performing communication between the API 133 or the application 134 and the kernel 131. In addition, for example, with respect to a work request received from one or more applications 134 and/or the middleware 132, load balancing of the work request may be performed by using a method of assigning a priority (a system resource such as the bus 110, the processor 120, or the memory 130 of the mobile phone 100 may be used based on the priority) to at least one application in the one or more applications 134.

The API 133 is an interface through which the application 134 can control a function provided by the kernel 131 or the middleware 132. The API 133 may include, for example, at least one interface or function for file control, window control, image processing, and character control.

The application 134 may include, for example, a home application, a dialing application, a short messaging service (SMS) application or a multimedia messaging service (MMS) application, an instant messaging (IM) application, a browser application, a camera application, an alarm clock application, a contact application, a voice dialing application, an e-mail (e-mail) application, a calendar application, a media player application, an album application, a clock application, and any other appropriate and/or similar application.

The user input module 150 may receive a command or data entered by a user by an input-output means (for example, a sensor, a keyboard, or a touchscreen), and may transmit the received command or data to the processor 120 or the memory 130 by using the bus 110. The display module 160 may display a video, an image, data, or the like to the user.

The display module 160 may display various types of information (for example, multimedia data and text data) received from the foregoing components.

The communications interface 170 may control a short-range communication connection with another electronic device 102. When the mobile phone 100 is paired with another electronic device, the communications interface 170 may stop waiting for a scanning operation of receiving a signal from a neighboring electronic device or stop an operation of broadcasting a broadcast signal. For example, in response to pairing of the mobile phone 100 with the another electronic device 102, the communications interface 170 stops waiting for a scanning operation of receiving a signal from a neighboring electronic device or stops an operation of broadcasting a broadcast signal. When the mobile phone 100 is paired with another electronic device, the communications interface 170 may control a period of the scanning or broadcasting operation.

According to each embodiment disclosed by this application, the mobile phone 100 may use the communications interface 170 to communicate with another electronic device. For example, the communications interface 170 may communicate with another electronic device 104, the server 106, and the like. The communications interface 170 may communicate with the another electronic device 104, the server 106, and the like directly or by using a network 162. For example, the communications interface 170 may connect the mobile phone 100 to the network 162.

Figure 4:
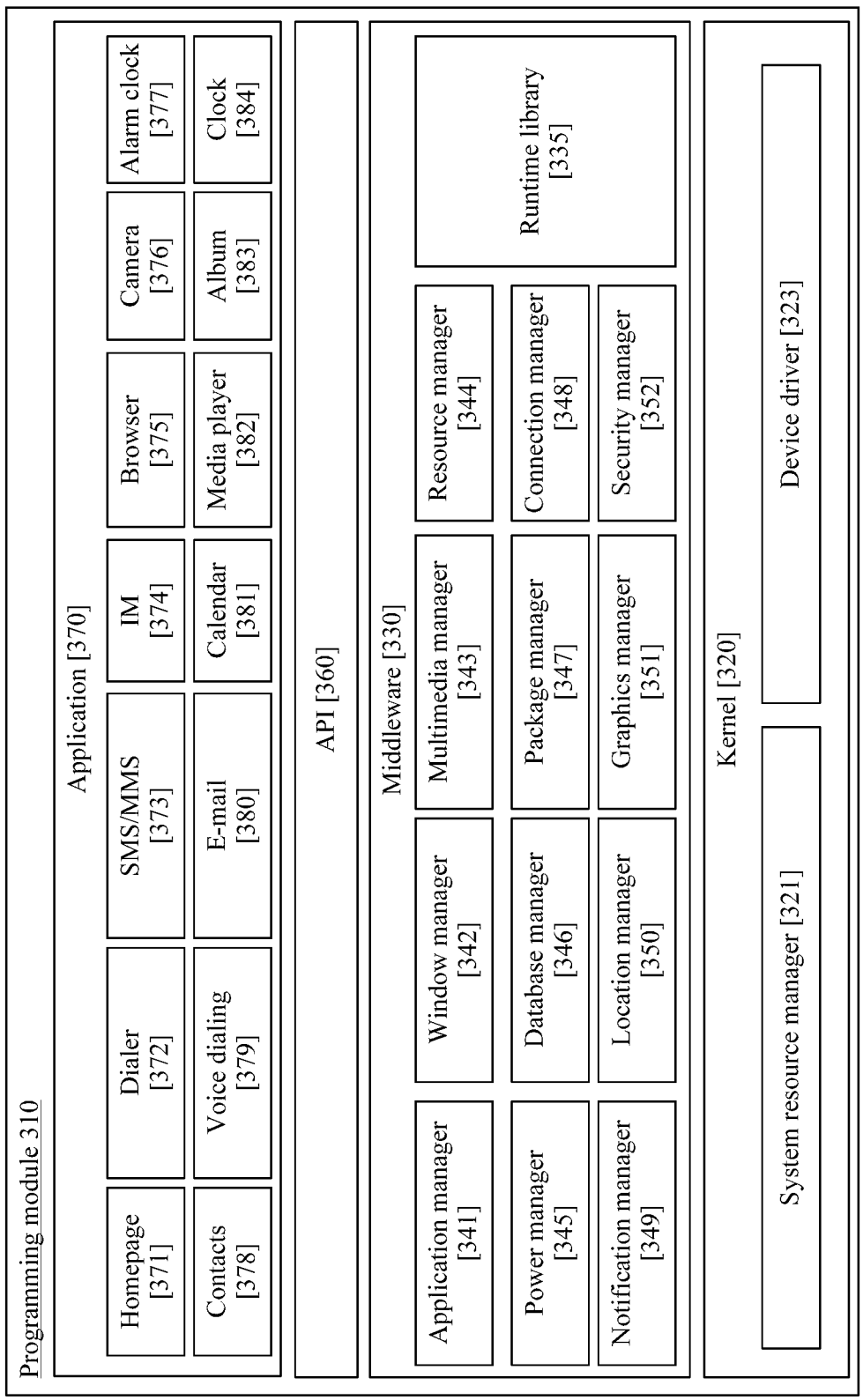
FIG. 4 is a schematic structural diagram of programming modules in a terminal according to an embodiment of this application.

Further, FIG. 4 shows a block diagram of configurations of programming modules in the memory 130 according to an embodiment disclosed by this application.

Referring to FIG. 4, the programming modules 310 may be included (or stored) in the mobile phone 100 (for example, the memory 130) shown in FIG. 3. At least one part of the programming modules 310 may be implemented as software, firmware, hardware, or a combination of two or more thereof. The programming modules 310 may be implemented as hardware (for example, hardware 201), and may include an OS for controlling resources related to an electronic device (for example, the mobile phone 100) and/or various applications (for example, the application 370) executed in an OS. For example, the OS may be Android, iOS, Windows, Symbian, Tizen, or Bada.

Referring to FIG. 4, the programming modules 310 may include a kernel 320, middleware 330, an API 360, and/or an application 370.

The kernel 320 (for example, the kernel 131) may include a system resource manager 321 and/or a device driver 323. The system resource manager 321 may include a process manager (not shown), a memory manager (not shown), and a file system manager (not shown). The system resource manager 321 may perform control, allocation, restoration, and the like on a system resource. The device driver 323 may include, for example, a display driver (not shown), a camera driver (not shown), a Bluetooth driver (not shown), a shared memory driver (not shown), a USB driver (not shown), a keyboard driver (not shown), a Wi-Fi driver (not shown), and/or an audio driver (not shown). In addition, according to an embodiment disclosed by this application, the device driver 323 may include an interprocess communication (IPC) driver (not shown).

The middleware 330 may include a plurality of modules that are implemented in advance, to provide a function shared by the application 370. In addition, the middleware 330 may provide a function to the application 370 by using the API 360, so that the application 370 can effectively use limited system resources in the electronic device. For example, as shown in FIG. 4, the middleware 330 (for example, the middleware 132) may include at least one of the following items: a runtime library 335, an application manager 341, a window manager 342, a multimedia manager 343, a resource manager 344, a power manager 345, a database manager 346, a package manager 347, a connection manager 348, a notification manager 349, a location manager 350, a graphics manager 351, a security manager 352, and any appropriate and/or similar manager.

The runtime library 335 may include a library module used by a compiler, to add a new function by using a programming language during running of the application 370. According to an embodiment disclosed by this application, the runtime library 335 may execute related functions such as input and output, memory management, and an algorithm function.

The application manager 341 may manage, for example, a lifecycle of at least one application 370. The window manager 342 may manage a graphical user interface (GUI) used on a screen. The multimedia manager 343 may detect a format for presenting various media files, and may encode or decode a media file by using a codec suitable for a related format. The resource manager 344 may manage resources of at least one application 370, such as source code, the memory, and storage space.

The power manager 345 may be operated together with a basic input/output system (BIOS), may manage a battery or a power supply, and may provide power information used for an operation, and the like. The database manager 346 may manage a database in such a manner that a database to be used by at least one application 370 can be generated, searched, and/or changed. The package manager 347 may manage installation and/or updating of an application distributed in a form of a package file.

The connection manager 348 may manage wireless connections such as Wi-Fi and BT connections. The notification manager 349 may display or report an event such as an arrival message, an appointment, or a proximity alert to the user in a manner not disturbing the user. The location manager 350 may manage location information of the electronic device. The graphics manager 351 may manage a graphic effect to be provided to the user and/or a UI related to a graphic effect. The security manager 352 may provide various security functions used for system security, user authentication, and the like. According to an embodiment disclosed by this application, when the electronic device (for example, the mobile phone 100) has a call function, the middleware 330 may further include a call manager (not shown), configured to manage an audio call function and/or a video call function of the electronic device.

The middleware 330 may generate and use anew middleware module by combining various functions of the foregoing internal component modules. The middleware 330 may provide a module dedicated to a type of OS, to provide a differential function. The middleware 330 may further dynamically remove some of existing components, or may add a new component. Therefore, the middleware 330 may omit some of the components described in each embodiment disclosed by this application, or may further include other components, or some of the components may be replaced with components executing similar functions and having different names.

The API 360 (for example, the API 133) is a set of API programming functions, and may have different configurations based on the OS. For example, in a case of Android or iOS, an API set may be provided to each platform. For example, in a case of Tizen, two or more API sets may be provided to each platform.

The application 370 (for example, the application 134 in FIG. 3) may include, for example, a pre-installed application and/or a third-party application. The application 370 (for example, the application 134) may include, for example, a homepage application 371, a dialing application 372, an SMS/MMS application 373, an IM application 374, a browser application 375, a camera application 376, an alarm clock application 377, a contact application 378, a voice dialing application 379, an e-mail application 380, a calendar application 381, a media player application 382, an album application 383, a clock application 384, and any other appropriate and/or similar application.

In this embodiment of this application, one or more control elements displayed in the display module 160 by the terminal may be used as a touch object for receiving a touch gesture entered by the user. For example, an icon of the application 370 may be used as a touch object to support and respond to a plurality of touch gestures entered in the user input module 150 by the user (for example, the touchscreen), for example, a pressure recognition gesture, a touch-and-hold gesture, and an area change gesture.

The control element may be an element implementing control through a direct operation. Generally, the control element has two basic features: a touchable state and a changeable state. In a human-machine interaction process, the user needs to implement an operation on a control element by performing data processing. Therefore, the display module 160 needs to present a control element, and the control element corresponds to the data on a one-to-one basis. For example, one or more control elements may correspond to one or more pieces of data on a one-to-one basis. For example, the control element may be information such as a picture, a text, a video, a link, a folder, or application software. This embodiment of the present invention is not limited thereto.

Figure 5:
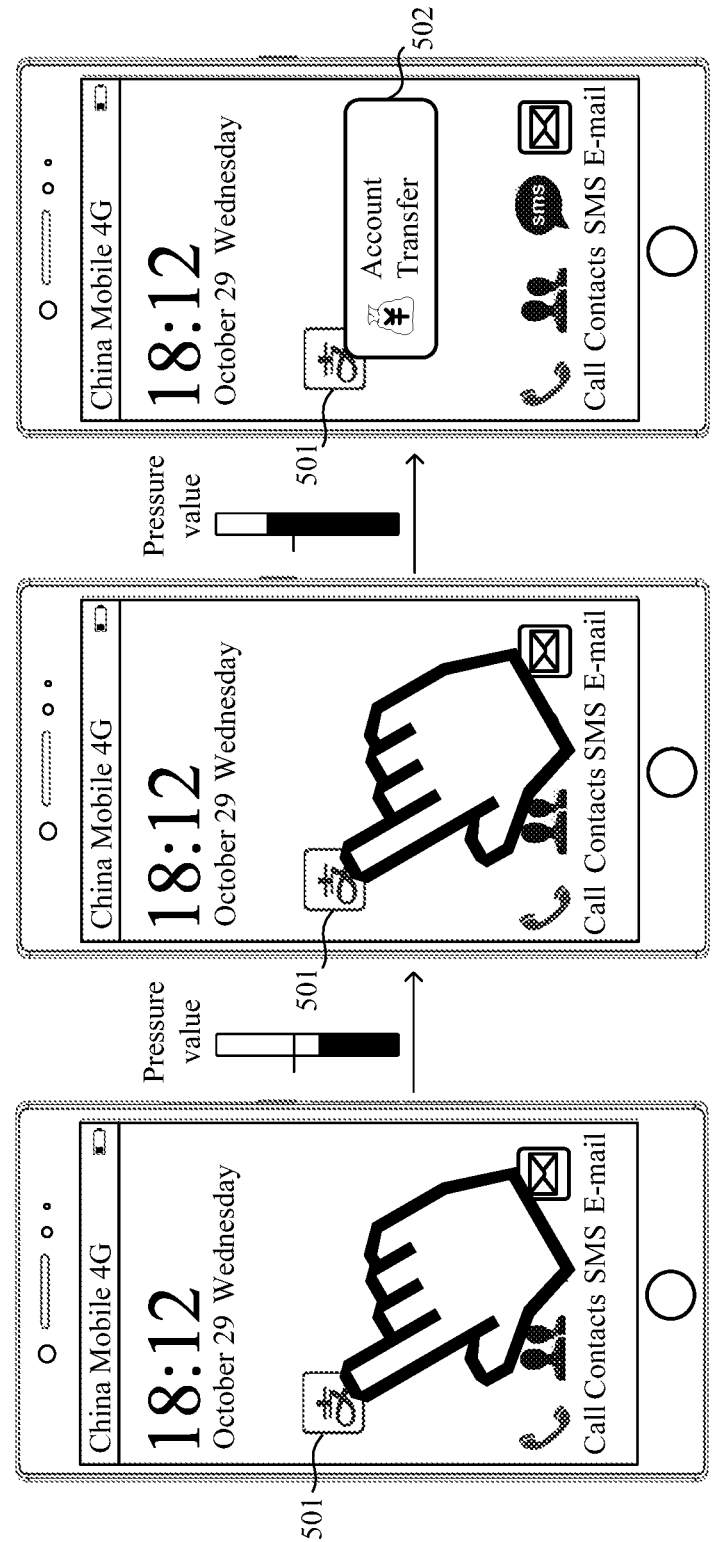
FIG. 5 is a schematic diagram of an application scenario of a pressure recognition gesture according to an embodiment of this application.

For example, a touch gesture shown in FIG. 5 is a pressure recognition gesture. Specifically, when the user performs a touch operation on a touch object on the touchscreen, the mobile phone may obtain a pressure value of pressing the touchscreen by a finger of the user. When the obtained pressure value reaches a preset pressure threshold, the mobile phone may recognize that the touch gesture is a pressure recognition gesture. In this case, in response to the pressure recognition gesture, the mobile phone may display a first shortcut function of the touch object. For example, the touch object of the user in FIG. 5 is an icon 501 of a payment application. In this case, after responding to the pressure recognition gesture entered by the user on the icon 501, the mobile phone may display a shortcut menu 502 having an "account transfer" function.

Figure 6:
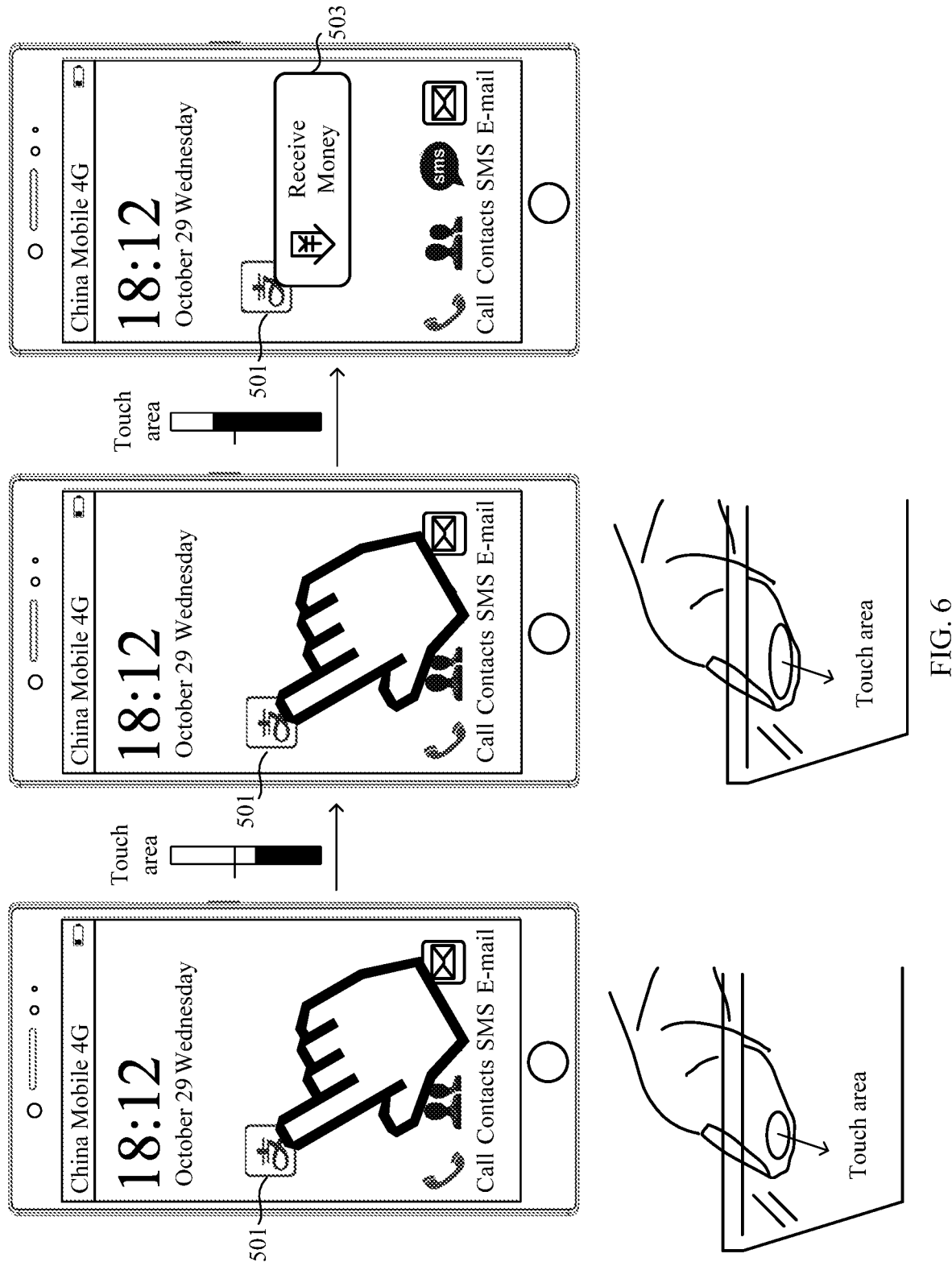
FIG. 6 is a schematic diagram of an application scenario of an area change gesture according to an embodiment of this application.

For example, a touch gesture shown in FIG. 6 is an area change gesture. Specifically, when the user performs a touch operation on a touch object on the touchscreen, the mobile phone may obtain a touch area between a finger of the user and the touchscreen. When the obtained touch area reaches a preset area threshold, the mobile phone may recognize that the touch gesture is an area change gesture. In this case, in response to the area change gesture, the mobile phone may display a second shortcut function of the touch object. For example, the touch object of the user in FIG. 6 is an icon 501 of a payment application. In this case, after responding to the area change gesture entered by the user on the mobile phone, the mobile phone may display a shortcut menu 503 having a "receive money" function.

Figure 7:
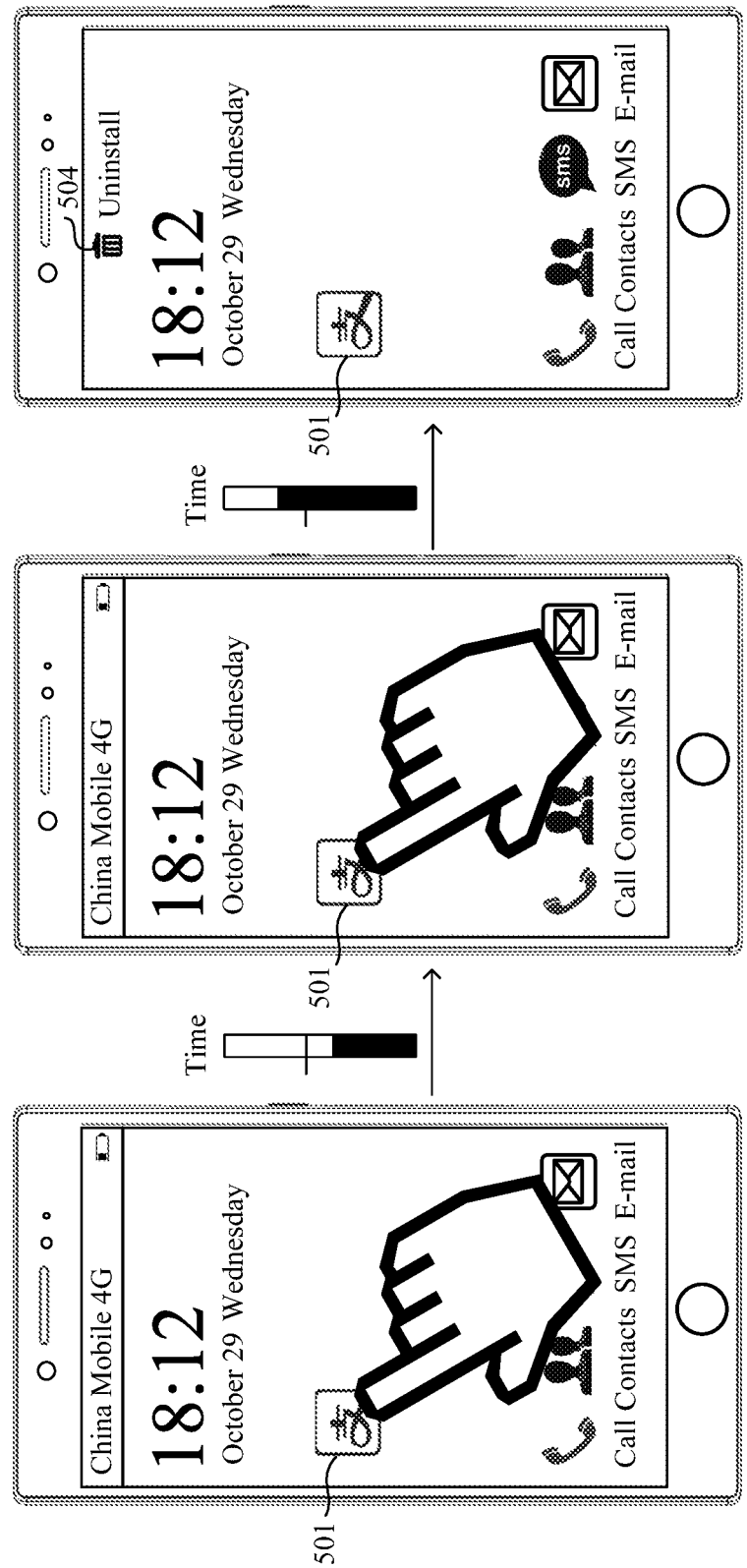
FIG. 7 is a schematic diagram of an application scenario of a touch-and-hold gesture according to an embodiment of this application.

For example, a touch gesture shown in FIG. 7 is a touch-and-hold gesture. Specifically, when the user performs a touch operation on a touch object on the touchscreen, the mobile phone may obtain duration of touching the touchscreen by a finger of the user. When the obtained duration reaches a preset time threshold, the mobile phone may recognize that the touch gesture is a touch-and-hold gesture. In this case, in response to the touch-and-hold gesture, the mobile phone may display a third shortcut function of the touch object. For example, the touch object of the user in FIG. 7 is an icon 501 of a payment application. In this case, after responding to the touch-and-hold gesture entered by the user on the mobile phone, the mobile phone may display a shortcut menu 504 having an "uninstalling" function.

Certainly, when the touch object is a window, a message, or a file (for example, a document, a picture, a video, or an audio) in an application, the mobile phone may also support one or more of touch gestures such as the foregoing pressure recognition gesture, touch-and-hold gesture, and area change gesture entered by the user on the mobile phone. This not limited in this embodiment of this application.

In this case, when the touch object operated by the user on the touchscreen supports a plurality of touch gestures (for example, the icon 501 of the foregoing payment application), interference may exist between the touch gestures.

For example, when the user touches the icon 501 of the payment application, an intention of the user is to perform a pressure recognition gesture to invoke the shortcut menu 503 having the "receiving money" function. However, if a speed of pressing the touchscreen by the user is relatively low, when the duration of touching the touchscreen by the finger reaches the time threshold of the touch-and-hold gesture, the pressure value of pressing the touchscreen by the finger has not reached the pressure threshold of the pressure recognition gesture. In this case, the mobile phone incorrectly determines that the user enters a touch-and-hold gesture on the icon 501, and therefore displays the shortcut menu 504 having the "uninstalling" function.

This is because the threshold (for example, the time threshold) used by the mobile phone to recognize different touch gestures is fixed and unitary. In this case, no matter how the user touches the touchscreen, as long as the mobile phone detects that the duration of touching the touchscreen by the finger reaches the time threshold, the mobile phone recognizes the touch gesture of the user as a touch-and-hold gesture. Consequently, a problem that when the user performs a pressure recognition gesture or an area change gesture, the gesture is incorrectly determined as a touch-and-hold gesture because the pressure threshold or the area threshold cannot be reached instantly.

In view of this, in the touch method provided by this embodiment of this application, when the touch object operated by the user supports not only the touch-and-hold gesture but also the pressure recognition gesture (and/or the area change gesture), the terminal may dynamically adjust, based on the pressure value of pressing the touchscreen by the finger of the user (and/or the touch area between the finger of the user and the touchscreen), the time threshold used by the terminal to recognize the touch-and-hold gesture, so that the terminal does not suffer interference from the touch-and-hold gesture when recognizing the pressure recognition gesture (and/or the area change gesture).

It should be noted that, touching the touch object by the finger may cause changes to the pressure value on the touchscreen, the touch area, the touch time, and the like; in addition, when a touch object displayed on the touchscreen is touched by an operating object such as a stylus or a joystick, changes may also be caused to the pressure value on the touchscreen, the touch area, the touch time, and the like. In this embodiment of this application, only the touch mode of touching the touchscreen by the finger is used as an example for description.

Figure 8A:
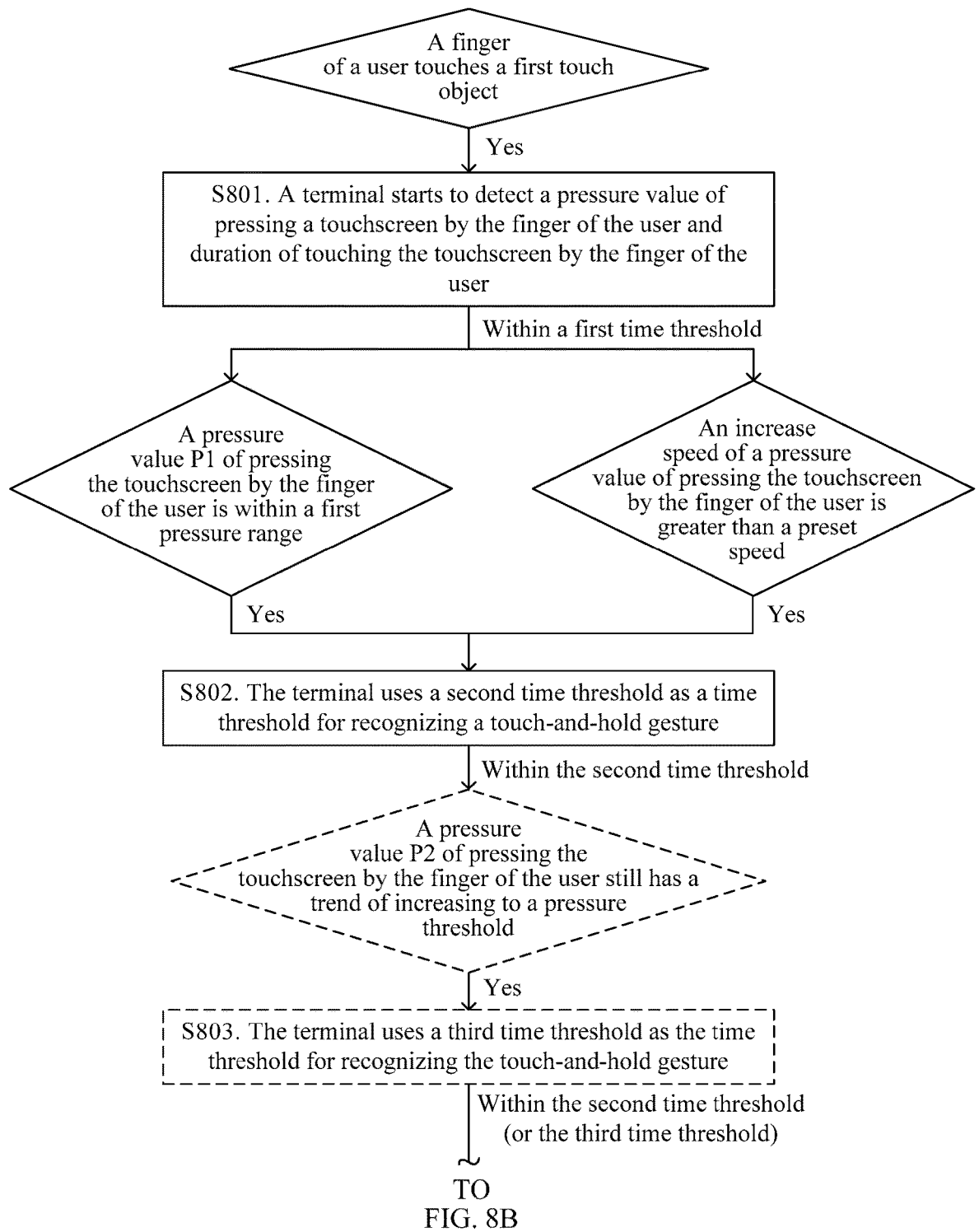
FIG. 8A and FIG. 8B are a schematic flowchart 1 of a touch method according to an embodiment of this application.
Figure 8B:
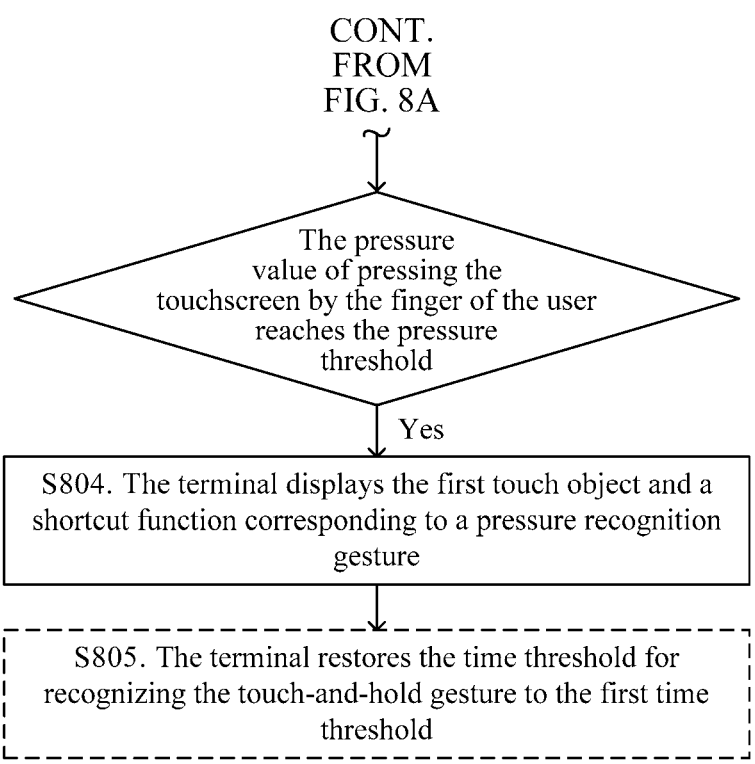

In some embodiments of this application, as shown in FIG. 8A and FIG. 8B, a touch method provided by an embodiment of this application includes the following steps.

S801. When detecting that a finger of a user touches a first touch object, a terminal starts to detect a pressure value of pressing a touchscreen by the finger of the user and duration of touching the touchscreen by the finger of the user.

The first touch object is a control element supporting a pressure recognition gesture and a touch-and-hold gesture. For example, the first touch object may be an application icon, a file included in an application, or a window in an application. This is not limited in this embodiment of this application.

Specifically, when the terminal installs each application, the application may register a touch gesture supported by each touch object in the terminal. For example, with reference to a terminal architecture shown in FIG. 4, using installation of a WeChat application as an example, the WeChat application may register, in the kernel 320 or the middleware 330, a touch object supporting a touch-and-hold gesture, including an icon of the WeChat application, a file or a message received in a chat window, and a file or a message in moments; in addition, a registered touch object supporting a pressure recognition gesture further includes the icon of the WeChat application and a picture in moments.

Figure 9:
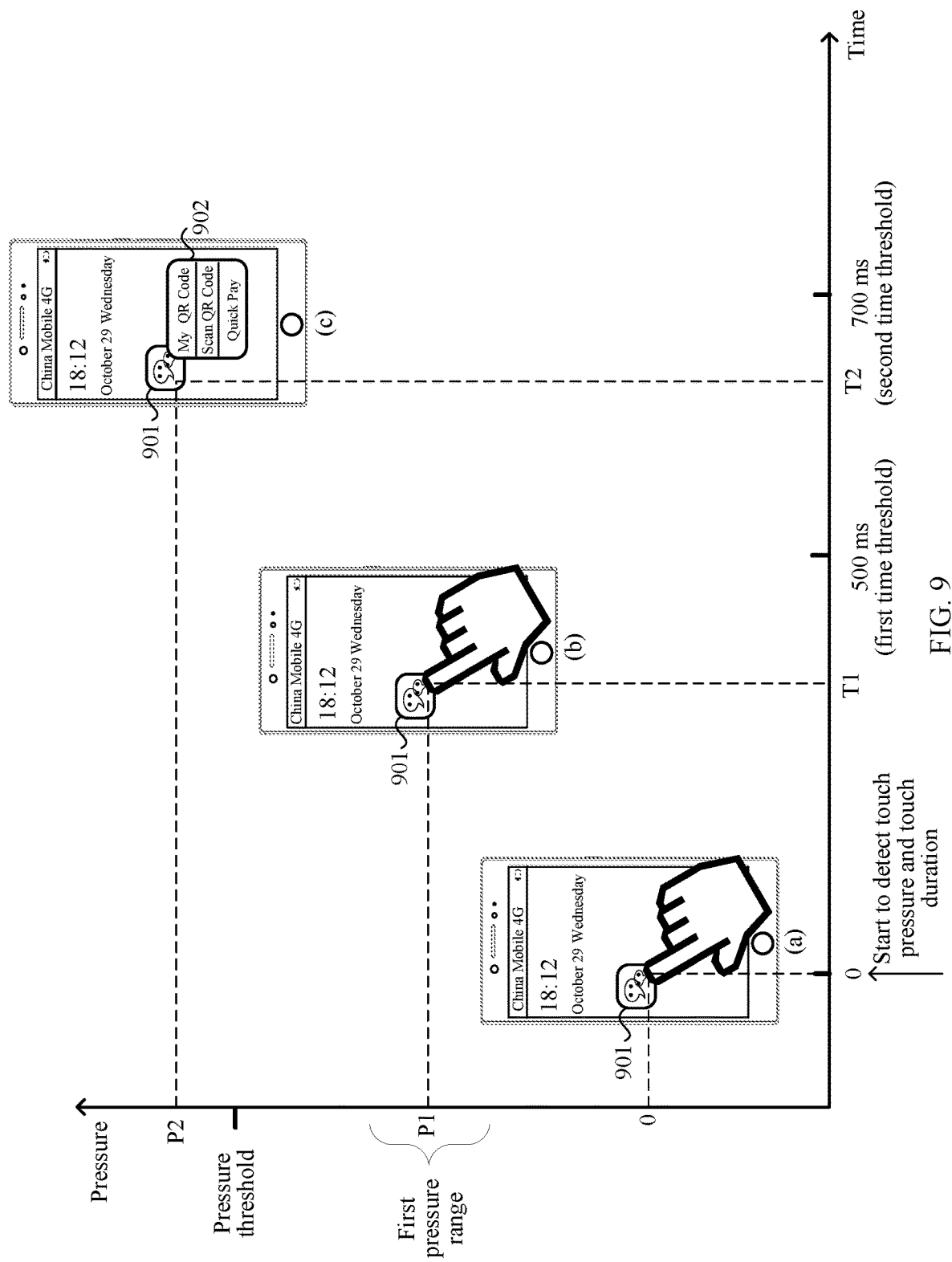
FIG. 9 is a schematic diagram 1 of an application scenario of a touch method according to an embodiment of this application.

Therefore, as shown in (a) of FIG. 9, when detecting that the finger of the user touches an icon 901 of the WeChat application, the terminal may determine, based on a touch gesture preregistered when the WeChat application is installed, whether the current touch object (that is, the icon 901 of the WeChat application) is the first touch object. If the icon 901 supports both a pressure recognition gesture and a touch-and-hold gesture, it may be determined that the icon 901 is the first touch object. However, an incorrect touch may occur between the two touch gestures. Therefore, the terminal may be triggered to start to obtain in real time a pressure value P (P≥0) of pressing the touchscreen by the finger of the user and duration T (T≥0) of touching the touchscreen by the finger of the user, so that the terminal recognizes a touch intention of the user based on changes of the pressure value P and the duration T.

For example, the touchscreen of the terminal may integrate a pressure sensor. Therefore, when it is detected that the icon 901 touched by the finger of the user is the first touch object, the pressure sensor may be triggered to periodically or aperiodically to report the detected pressure value P to a processor of the terminal.

In addition, a timer may be further set in the terminal. When it is detected that the icon 901 touched by the finger of the user is the first touch object, the timer may be triggered to start timing. In this case, by reading a value of the timer, the duration T of touching the touchscreen by the finger of the user may be obtained.

S802*a*. If detecting, within a first time threshold, that a pressure value P1 of pressing the touchscreen by the finger of the user is within a first pressure range, the terminal uses a second time threshold as a time threshold for recognizing the touch-and-hold gesture.

The first time threshold may be a default value when the terminal recognizes a touch-and-hold gesture, and the first time threshold is generally stored in a memory of the terminal as a default parameter when the terminal is delivered. For example, as shown in FIG. 9, the first time threshold may be set to 500 ms. To be specific, by default (for example, the icon 901 supports only the touch-and-hold gesture), when it is detected that the duration of touching the touchscreen by the finger of the user reaches 500 ms, the touch gesture currently performed by the user may be recognized as the touch-and-hold gesture.

Certainly, the first time threshold may also be a value less than 500 ms. To be specific, before preset duration of determining the touch-and-hold gesture is reached, whether the detected pressure value satisfies a preset condition is determined, and if yes, the touch-and-hold time threshold is adjusted.

Alternatively, the terminal may further pre-store time thresholds of a plurality of touch-and-hold gestures, for example, 500 ms, 700 ms, and 1000 ms, and a condition corresponding to each threshold, for example, a pressure value range, and an area range of touching by the finger. In this case, the first time threshold may be a time threshold used when a touch-and-hold gesture entered by the user is recognized previously. In this case, in step S802*a*, the terminal may determine, based on the pressure value P1 of pressing the touchscreen by the finger of the user, one (that is, the second time threshold) of 500 ms, 700 ms, and 1000 ms as the time threshold for recognizing the touch-and-hold gesture currently.

In addition, as shown in FIG. 9, an upper limit of the first pressure range is less than a pressure threshold for recognizing the pressure recognition gesture, and a lower limit of the first pressure range is greater than 0. Generally, the lower limit of the first pressure range may be set to a pressure value generated by an ordinary touch operation or set to be greater than a pressure value generated by an ordinary touch operation. Therefore, when it is detected that the pressure value P of pressing the touchscreen by the finger of the user falls within the first pressure range, it indicates that the pressure value of pressing the touchscreen after the user touches the icon 901 increases, and that the user may intentionally press the touchscreen to perform the pressure recognition gesture.

Certainly, a person skilled in the art may set the upper limit and the lower limit of the first pressure range based on actual experience or an actual application scenario, or the terminal may obtain the upper limit and the lower limit of the first pressure range through self-learning based on an operation habit of the user on the touchscreen. This is not limited in this embodiment of this application.

In this case, as shown in (b) of FIG. 9, within the first time threshold 500 ms, if it is detected at a time T1 (0 ms<T1<500 ms) that the pressure value P1 of pressing the touchscreen by the finger of the user falls within the first pressure range, it indicates that the touch intention of the user is to perform the pressure recognition gesture. In this case, if the pressure value P1 of pressing the touchscreen by the finger of the user does not reach the pressure threshold within 500 ms, a problem that the terminal incorrectly determines the touch gesture entered by the user as the touch-and-hold gesture may occur. Therefore, the terminal may extend the default first time threshold to a second time threshold that has a relatively loose time limit (the second time threshold is greater than the first time threshold), to provide the user with more time to complete the pressure recognition gesture so that the gesture is not incorrectly recognized as the touch-and-hold gesture. For example, in FIG. 9, the terminal extends the first time threshold 500 ms to a second time threshold 700 ms.

Therefore, before the timer reaches 700 ms, if the pressure value P of pressing the touchscreen by the finger of the user may reach the pressure threshold, the terminal may be triggered to display the icon 901 and a shortcut function corresponding to the pressure recognition gesture, to reduce a probability that the terminal incorrectly determines the pressure recognition gesture as the touch-and-hold gesture.

Optionally, a correspondence between the first pressure range and the second time threshold may be preset in the terminal. For example, when the first pressure range is a half-open and half-closed interval (1.5 N, 2 N], the corresponding second time threshold may be set to 700 ms; or when the first pressure range is a half-open and half-closed interval (2 N, 2.5 N], the corresponding second time threshold may be set to 800 ms. This is not limited in this embodiment of this application.

In this case, when the terminal detects that the pressure value P of pressing the touchscreen by the finger of the user falls within the first pressure range, the specific second time threshold may be determined based on the correspondence, so that the first time threshold is adjusted to the second time threshold.

Alternatively, a function relationship between the pressure value P of pressing the touchscreen by the finger of the user and the second time threshold: y1(second time threshold)=F(P) may be preset in the terminal. Therefore, when the terminal detects that the pressure value P of pressing the touchscreen by the finger of the user falls within the first pressure range, the pressure value P may be substituted into the function relationship to obtain the second time threshold through calculation, so that the first time threshold is adjusted to the second time threshold.

Certainly, the function relationship may be another linear function relationship, a non-linear function relationship, or a weighting function relationship. A person skilled in the art may set the function relationship based on actual experience or an actual application scenario.

Figure 10:
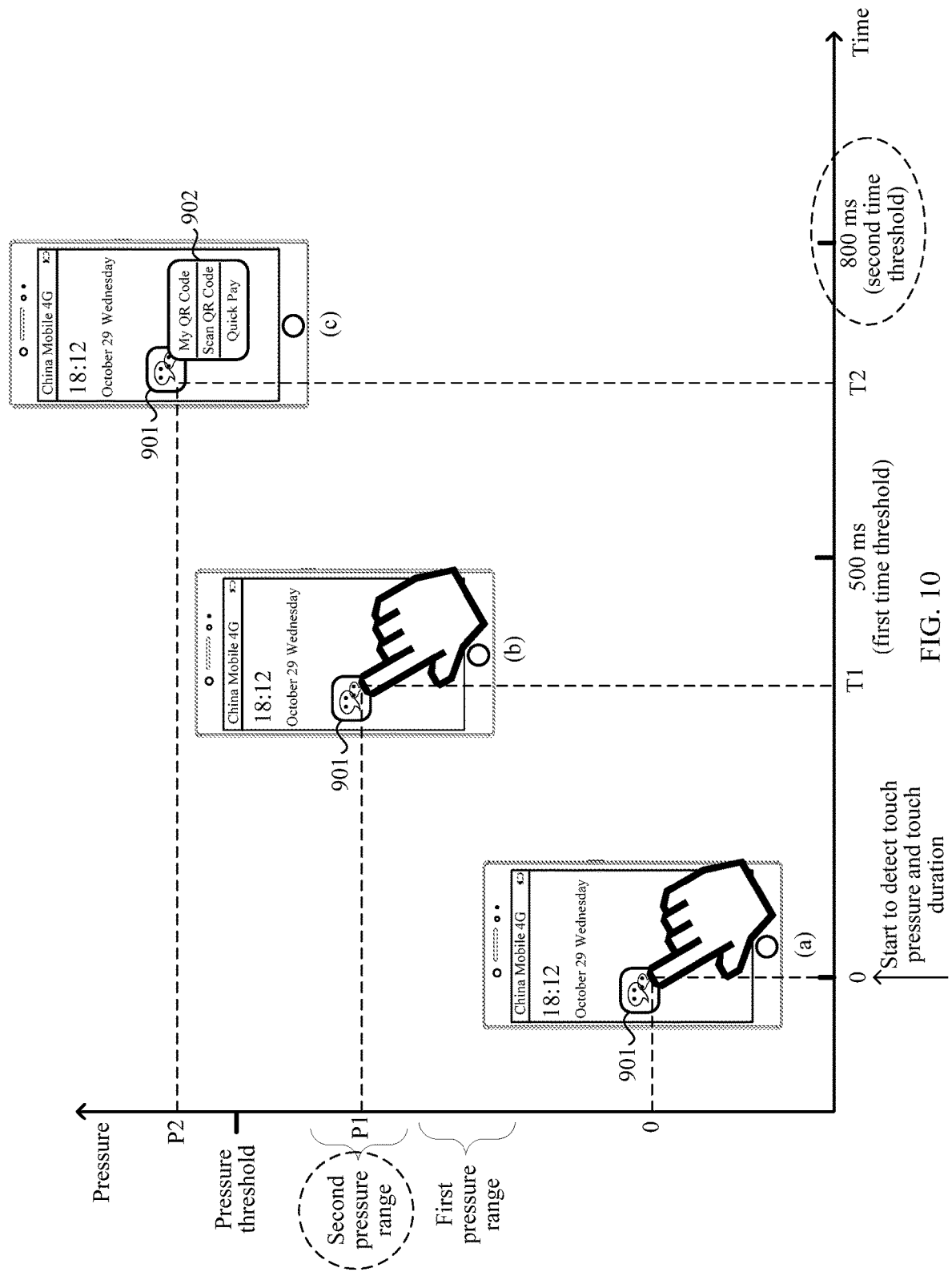
FIG. 10 is a schematic diagram 2 of an application scenario of a touch method according to an embodiment of this application.

Further, as shown in FIG. 10, the terminal may further preset a plurality of pressure ranges, for example, a first pressure range and a second pressure range in FIG. 10, where a lower limit of the second pressure range is greater than or equal to an upper limit of the first pressure range, and a second time threshold corresponding to the second pressure range is 800 ms.

In this case, still as shown in FIG. 10, if it is detected at a time T1 (0 ms<T1<500 ms) that the pressure value P1 of pressing the touchscreen by the finger of the user falls within the second pressure range, it may indicate that a pressure value of pressing the touchscreen by the finger of the user increases faster within a short time, in comparison with the pressure change shown in FIG. 9. To be specific, the intention of performing the pressure recognition gesture by the user is more obvious in this case. Therefore, the terminal may extend the default first time threshold to 800 ms (the second time threshold) having a looser time limit, to further reduce a probability that the terminal incorrectly determines the pressure recognition gesture as the touch-and-hold gesture.

In addition, the following step S802b is an optional alternative method for step S802a. To be specific, there may be a plurality of conditions for triggering the terminal to adjust the first time threshold for recognizing the touch-and-hold gesture to the second time threshold. This is not limited in this embodiment of this application.

S802b. If detecting, within a first time threshold, that an increase speed of a pressure value of pressing the touchscreen by the finger of the user is greater than a preset speed, the terminal uses a second time threshold as a time threshold for recognizing the touch-and-hold gesture.

Figure 11:
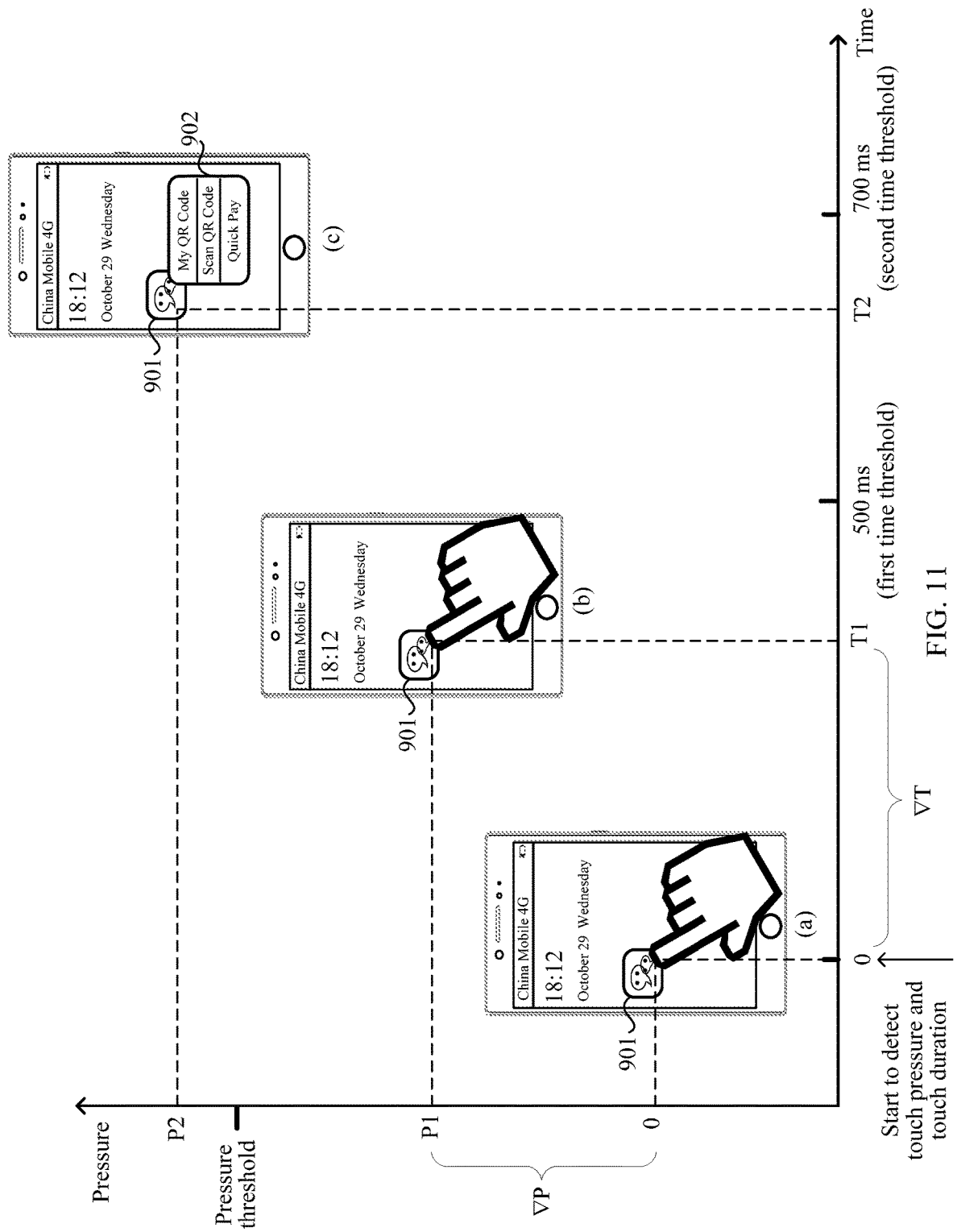
FIG. 11 is a schematic diagram 3 of an application scenario of a touch method according to an embodiment of this application.

Different from the foregoing step S802a, as shown in FIG. 11, within the first time threshold 500 ms, if it is detected, within a time $\nabla T$, that a change $\nabla P$ of the pressure value P of pressing the touchscreen by the finger of the user is greater than preset pressure, that is, the increase speed of the pressure value P of pressing the touchscreen by the finger of the user is greater than the preset speed, it may also indicate that the touch intention of the user in this case is to perform the pressure recognition gesture.

Therefore, to reduce a probability that the terminal incorrectly determines the pressure recognition gesture as the touch-and-hold gesture, the terminal may extend the default first time threshold to the second time threshold having a relatively loose time limit (the second time threshold is greater than the first time threshold). For example, in FIG. 11, the terminal extends the first time threshold 500 ms to the second time threshold 700 ms.

Similarly, a correspondence between the preset speed and the second time threshold may be preset in the terminal. In this case, when the terminal detects that the increase speed ($\nabla P/\nabla T$) of the pressure value P is greater than the preset speed, the specific second time threshold may be determined based on the correspondence, so that the first time threshold is adjusted to the second time threshold.

Alternatively, a function relationship between the increase speed of the pressure value P and the second time threshold may be preset in the terminal: y2(second time threshold)=F($\nabla P/\nabla T$). Therefore, when the terminal detects that the increase speed ($\nabla P/\nabla T$) of the pressure value P is greater than the preset speed, the increase speed ($\nabla P/\nabla T$) detected in this case may be substituted into the function relationship to obtain the specific second time threshold through calculation, so that the first time threshold is adjusted to the second time threshold.

S803 (optional). If detecting, within the second time threshold, that a pressure value P2 of pressing the touchscreen by the finger of the user still has a trend of increasing to the pressure threshold, the terminal uses a third time threshold as the time threshold for recognizing the touch-and-hold gesture.

Further, after the terminal adjusts the first time threshold for recognizing the touch-and-hold gesture to the second time threshold, and before the extended second time threshold is reached, if detecting that the pressure value P of pressing the touchscreen by the finger of the user does not reach the pressure threshold, the terminal still continues to detect the pressure value P of pressing the touchscreen by the finger of the user and duration T of touching the touchscreen by the finger of the user.

Figure 12:
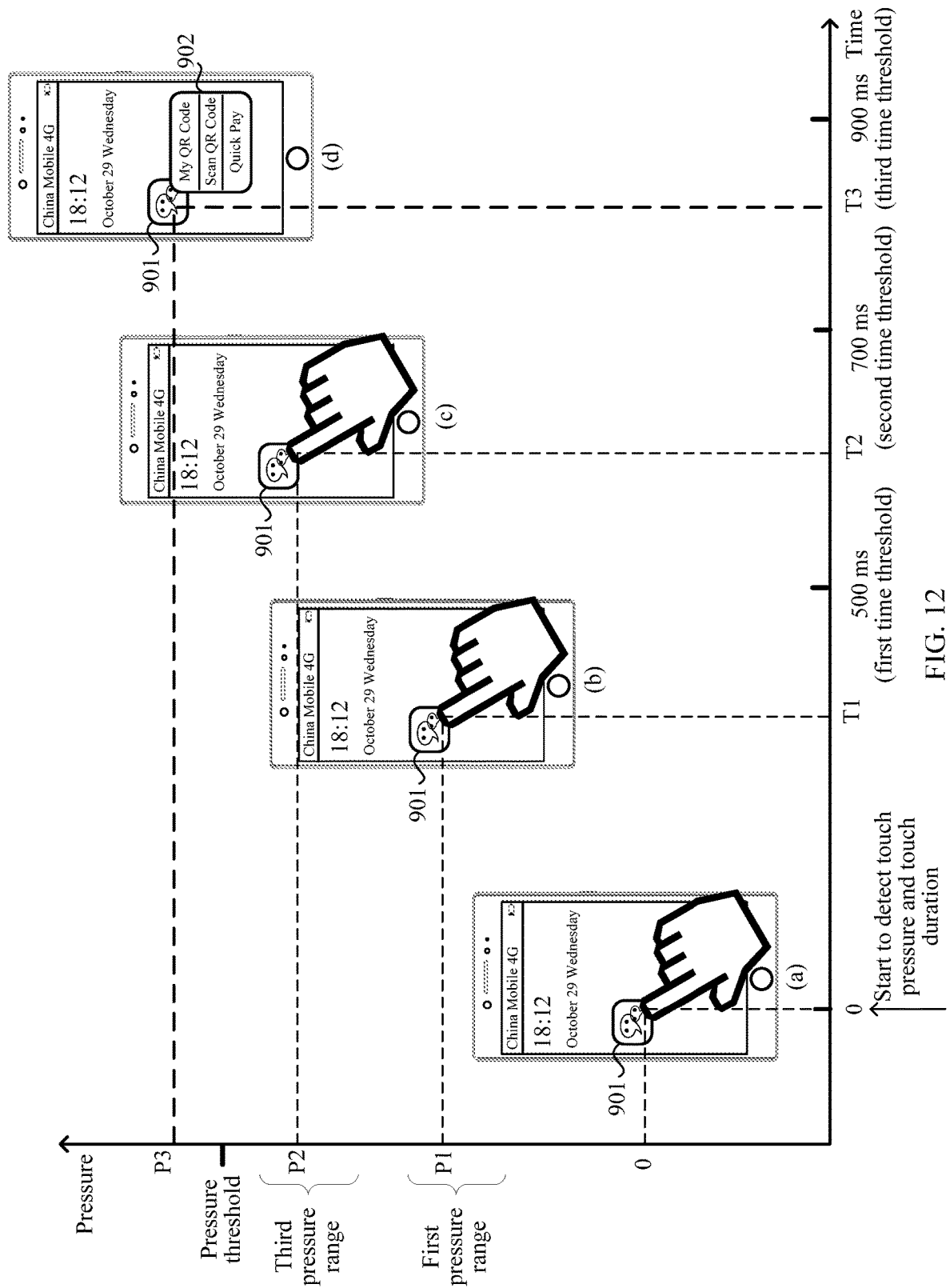
FIG. 12 is a schematic diagram 4 of an application scenario of a touch method according to an embodiment of this application.

In this case, as shown in (c) of FIG. 12, if it is detected, within the second time threshold 700 ms, that the pressure value P2 of pressing the touchscreen by the finger of the user falls within a third pressure range closer to the pressure threshold (a lower limit of the third pressure range is greater than an upper limit of the first pressure range), it indicates that the user still continues to press the touchscreen with more strength, that is, the touch intention of the user is still to perform the pressure recognition gesture.

Therefore, to reduce a probability that the terminal incorrectly determines the pressure recognition gesture as the touch-and-hold gesture, the terminal may further extend the second time threshold for recognizing the touch-and-hold gesture in this case to the third time threshold (the third time threshold is greater than the second time threshold). For example, in FIG. 12, the terminal extends the second time threshold 700 ms to the third time threshold 900 ms.

Certainly, subsequently if it is not detected, within the third time threshold, that the pressure value of pressing the touchscreen by the finger of the user reaches the pressure threshold, but the pressure value has a trend of increasing to the pressure threshold, the terminal may continue to extend the time threshold for recognizing the touch-and-hold gesture. For example, the terminal extends the time threshold for recognizing the touch-and-hold gesture from 900 ms to 1000 ms. In addition, the terminal may further determine, based on an operation habit of the user, the time threshold for recognizing the touch-and-hold gesture. This is not limited in this embodiment of this application.

It should be noted that, the terminal may preset an upper time limit for the time threshold for recognizing the touch-and-hold gesture. For example, the upper time limit is 1000 ms. This is because if the pressure value of pressing the touchscreen by the user within 1000 ms does not reach the pressure threshold, it indicates that the touch intention of the user in this case is probably not to perform the pressure recognition gesture. Therefore, after the terminal extends the time threshold for recognizing the touch-and-hold gesture to 1000 ms, the terminal does not continue to extend the time threshold any longer, to avoid interference caused by unlimited extension of the time threshold on recognition of another touch gesture by the terminal.

S804. If detecting, within the second time threshold (or the third time threshold), that the pressure value of pressing the touchscreen by the finger of the user reaches the pressure threshold, the terminal displays the first touch object and the shortcut function corresponding to the pressure recognition gesture.

Specifically, as shown in (c) of FIG. 9 to FIG. 11, or (d) of FIG. 12, within the extended second time threshold (or the third time threshold), if detecting that the pressure value P of pressing the touchscreen by the finger of the user reaches the pressure threshold, the terminal may determine that the touch gesture entered by the user on the icon 901 is the pressure recognition gesture. In this case, the terminal may be triggered to display a shortcut function of the WeChat application corresponding to the pressure recognition gesture, for example, a shortcut menu 902 shown in (c) of FIG. 9 to FIG. 11, or (d) of FIG. 12.

Certainly, if the terminal recognizes that the touch gesture entered by the user on the icon 901 is another touch gesture, for example, the touch-and-hold gesture or a tapping gesture, the terminal may correspondingly display the WeChat application and a shortcut function corresponding to the recognized touch gesture. This is not limited in this embodiment of this application.

S805 (optional). The terminal restores the time threshold for recognizing the touch-and-hold gesture to the first time threshold.

Specifically, in step S805, after the terminal recognizes that the touch gesture currently entered by the user on the first touch object is the pressure recognition gesture, if the time threshold for recognizing the touch-and-hold gesture is extended from the initial default value in this case, for example, the time threshold for recognizing the touch-and-hold gesture is extended from the first time threshold 500 ms to the second time threshold 700 ms in FIG. 9, the terminal may restore the time threshold to the default first time threshold 500 ms of the terminal.

Therefore, when the user enters a touch gesture on a touch object (for example, a file of an application) again subsequently, if the touch object is the first touch object supporting the touch-and-hold gesture and the pressure recognition gesture, the terminal may still repeat the foregoing steps S801 to S805 to recognize and respond to the touch gesture, to reduce a probability that the terminal incorrectly determines the pressure recognition gesture as the touch-and-hold gesture.

Figure 23:
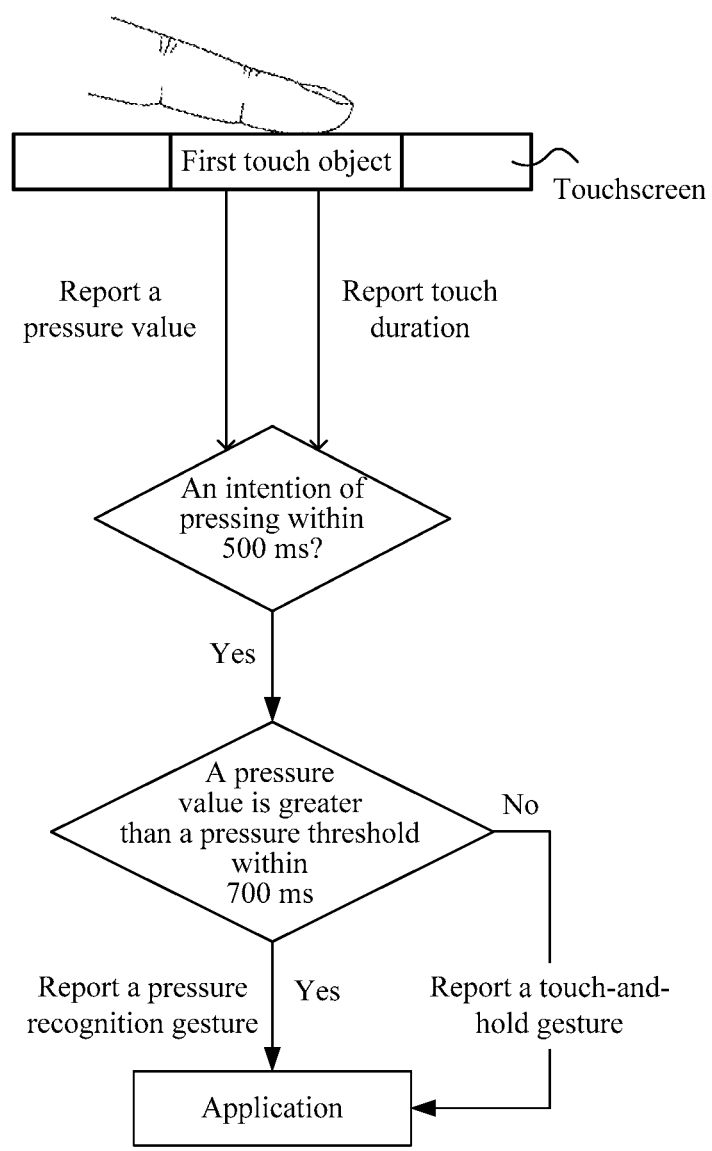
FIG. 23 is a schematic diagram 12 of an application scenario of a touch method according to an embodiment of this application.

In other embodiments of this application, as shown in FIG. 23, when the finger of the user touches the first touch object, if the terminal can recognize, within the first time threshold (for example, 500 ms), the pressure intention of performing the pressure recognition gesture by the user, when the touch duration reaches the first time threshold 500 ms for recognizing the touch-and-hold gesture, without changing the first time threshold 500 ms, the terminal may temporarily not report, to the application to which the first touch object belongs, that the gesture performed by the user is the touch-and-hold gesture. In this case, the terminal may continue to determine whether the pressure value detected within the second time threshold (for example, 700 ms) reaches the pressure threshold.

If the pressure value reaches the pressure threshold, it indicates that the touch gesture performed by the user is the pressure recognition gesture. In this case, the terminal may further report the pressure recognition gesture to the application to which the first touch object belongs, to present the shortcut function corresponding to the pressure recognition gesture.

Correspondingly, if the pressure threshold is not reached, it indicates that the pressure by the user within 500 ms may be an unintentional operation, and that an actual touch intention of the user is to perform the touch-and-hold gesture. In this case, the terminal may further report the touch-and-hold gesture to the application to which the first touch object belongs, to present a shortcut function corresponding to the touch-and-hold gesture.

Figure 13A:
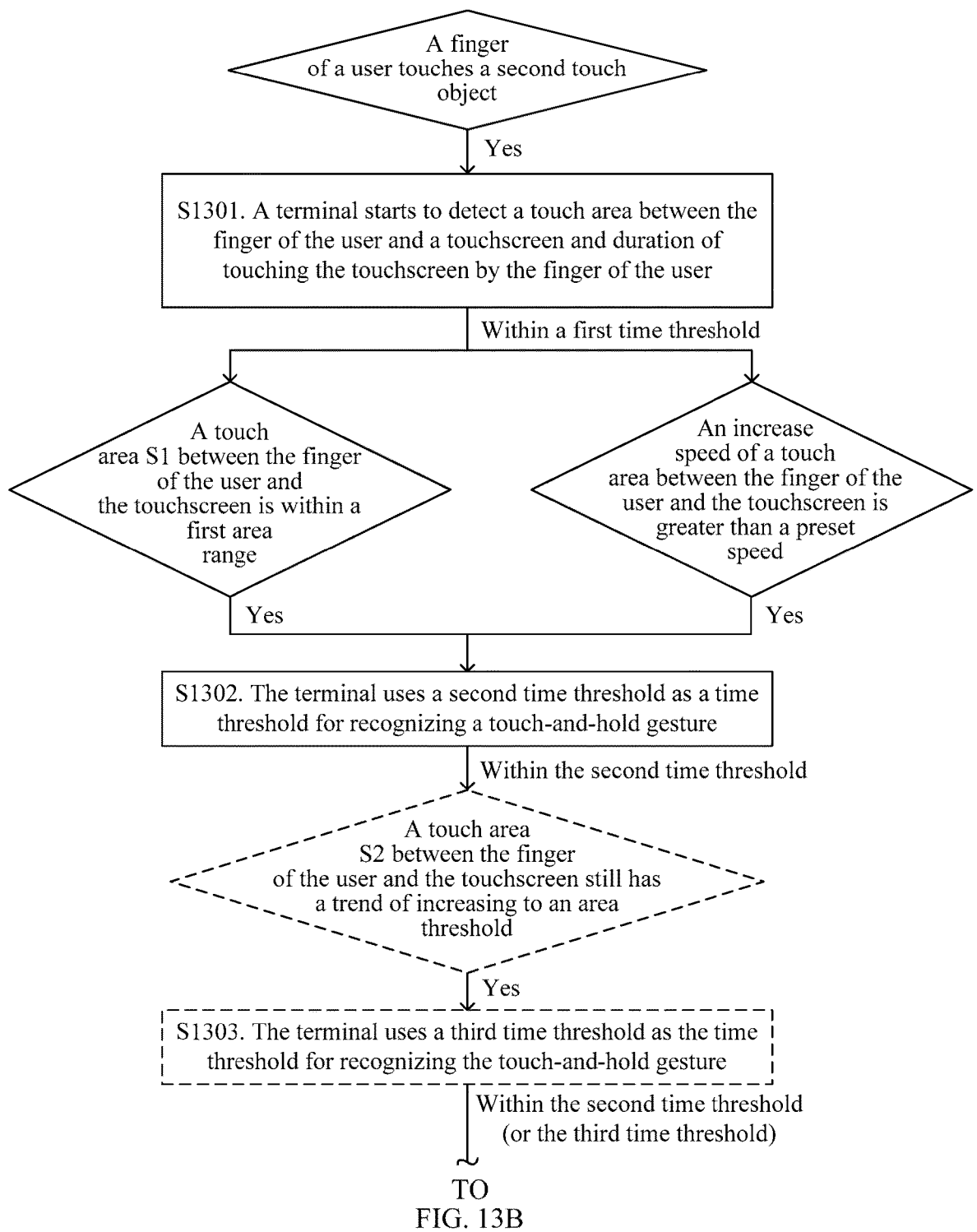
FIG. 13A and FIG. 13B are a schematic flowchart 2 of a touch method according to an embodiment of this application.
Figure 13B:
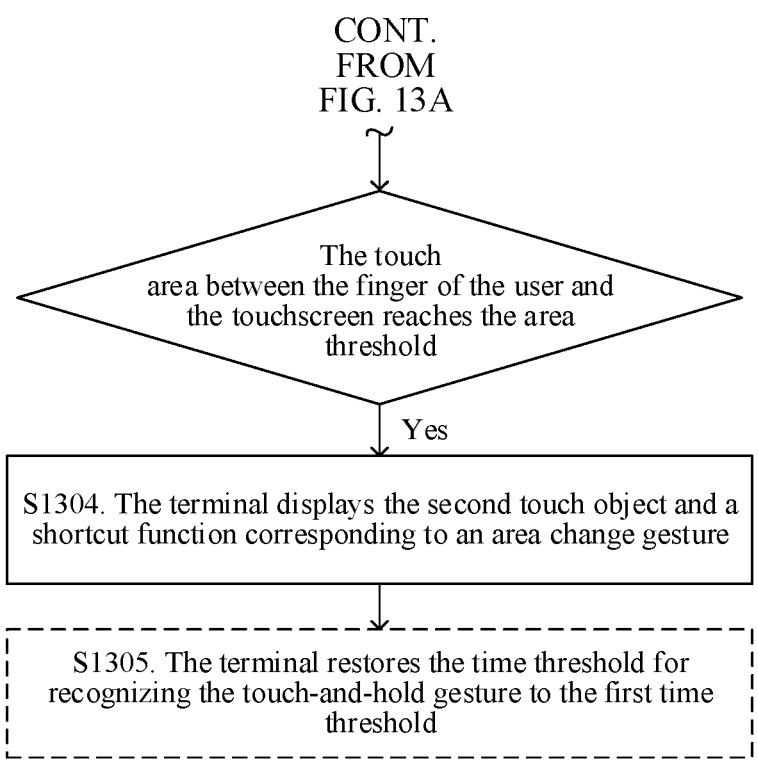

In some embodiments of this application, as shown in FIG. 13A and FIG. 13B, a touch method provided by an embodiment of this application includes the following steps.

S1301. When detecting that a finger of a user touches a second touch object, a terminal starts to detect a touch area between the finger of the user and a touchscreen and duration of touching the touchscreen by the finger of the user.

The second touch object is a control element supporting an area change gesture and a touch-and-hold gesture. Similar to the first touch object, the second touch object may also be an application icon, a file included in an application, a window in an application, or the like. This is not limited in this embodiment of this application.

Figure 14:
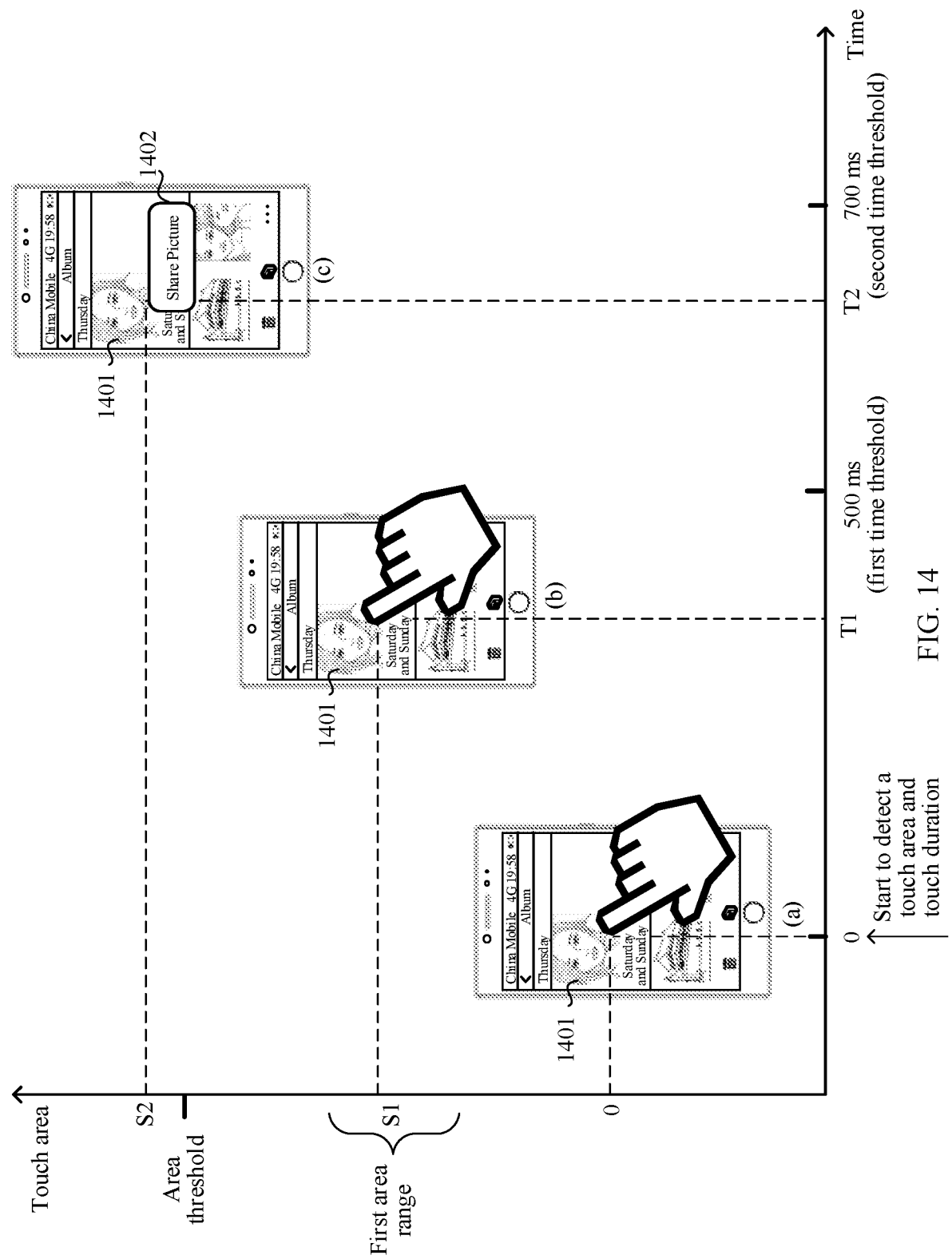
FIG. 14 is a schematic diagram 5 of an application scenario of a touch method according to an embodiment of this application.

As shown in FIG. 14, for example, an image 1404 in an album application is used as the second touch object. As shown in (a) of FIG. 14, when detecting that the finger of the user touches the image 1401, the terminal may determine, based on a touch gesture preregistered when the album application is installed, whether the current touch object (that is, the image 1401) is the second touch object.

If the image 1401 is the second touch object supporting not only the area change gesture but also the touch-and-hold gesture, to avoid incorrect determining when the terminal recognizes the two touch gestures, the terminal may be triggered to start to obtain in real time a touch area S (S≥0) between the finger of the user and the touchscreen and duration T (T≥0) of touching the touchscreen by the finger of the user, so that the terminal recognizes a touch intention of the user based on changes of the touch area S and the duration T.

S1302a. If detecting, within a first time threshold, that a touch area S1 between the finger of the user and the touchscreen is within a first area range, the terminal uses a second time threshold as a time threshold for recognizing the touch-and-hold gesture.

As in the foregoing steps S801 to S805, the first time threshold may be a default value when the terminal recognizes a touch-and-hold gesture, or may be a time threshold used when a touch-and-hold gesture entered by the user is recognized previously.

In addition, similar to the first pressure range set in the foregoing steps S801 to S805, as shown in FIG. 14, an upper limit of the first area range is less than an area threshold when the terminal recognizes the area change gesture, and a lower limit of the first area range is greater than 0. Generally, the lower limit of the first area range may be set to a touch area of the touchscreen when the user performs an ordinary touch operation or set to be greater than a touch area of the touchscreen when the user performs an ordinary touch area. Therefore, when it is detected that the touch area S of touching the touchscreen by the finger of the user falls within the first area range, it indicates that the touch area between the finger of the user and the touchscreen when the finger of the user touches the touchscreen increases, and that the user may intentionally perform the area change gesture.

Certainly, a person skilled in the art may set the upper limit and the lower limit of the first area range based on actual experience or an actual application scenario, or the terminal may obtain the upper limit and the lower limit of the first area range through self-learning based on an operation habit of the user on the touchscreen. This is not limited in this embodiment of this application.

In this case, as shown in (b) of FIG. 14, within the first time threshold 500 ms, if it is detected at a time T1 (0 ms<T1<500 ms) that the touch area S1 between the finger of the user and the touchscreen falls within the first area range, it indicates that the touch intention of the user is to perform the area change gesture. In this case, if the touch area S does not reach the area threshold within 500 ms, a problem that the terminal incorrectly determines the touch gesture entered by the user as the touch-and-hold gesture may occur. Therefore, the terminal may extend the default first time threshold to a second time threshold that has a relatively loose time limit (the second time threshold is greater than the first time threshold). For example, the terminal extends the first time threshold 500 ms to a second time threshold 700 ms in FIG. 14.

Therefore, if the touch area S between the finger of the user and the touchscreen reaches the area threshold within 700 ms, the terminal may be triggered to display the image 1401 and a shortcut function corresponding to the area change gesture, to reduce a probability that the terminal incorrectly determines the area change gesture as the touch-and-hold gesture.

Optionally, a correspondence between the first area range and the second time threshold may be preset in the terminal. For example, when the first area range is 50 to 65 pixels, the corresponding second time threshold may be set to 700 ms; or when the first area range is 65 to 80 pixels, the corresponding second time threshold may be set to 800 ms. This is not limited in this embodiment of this application.

In this case, when the terminal detects that the touch area S between the finger of the user and the touchscreen falls within the first area range, the specific second time threshold may be determined based on the correspondence, so that the first time threshold is adjusted to the second time threshold.

Alternatively, a function relationship between the second time threshold and the touch area S between the finger of the user and the touchscreen: $y3$(second time threshold)$=F(P)$ may be preset in the terminal. Therefore, when the terminal detects that the touch area S between the finger of the user and the touchscreen falls within the first area range, the touch area S may be substituted into the function relationship to obtain the specific second time threshold through calculation, so that the first time threshold is adjusted to the second time threshold.

Certainly, the function relationship may be a linear function relationship, a non-linear function relationship, or a weighting function relationship. A person skilled in the art may set the function relationship based on actual experience or an actual application scenario.

Figure 15:
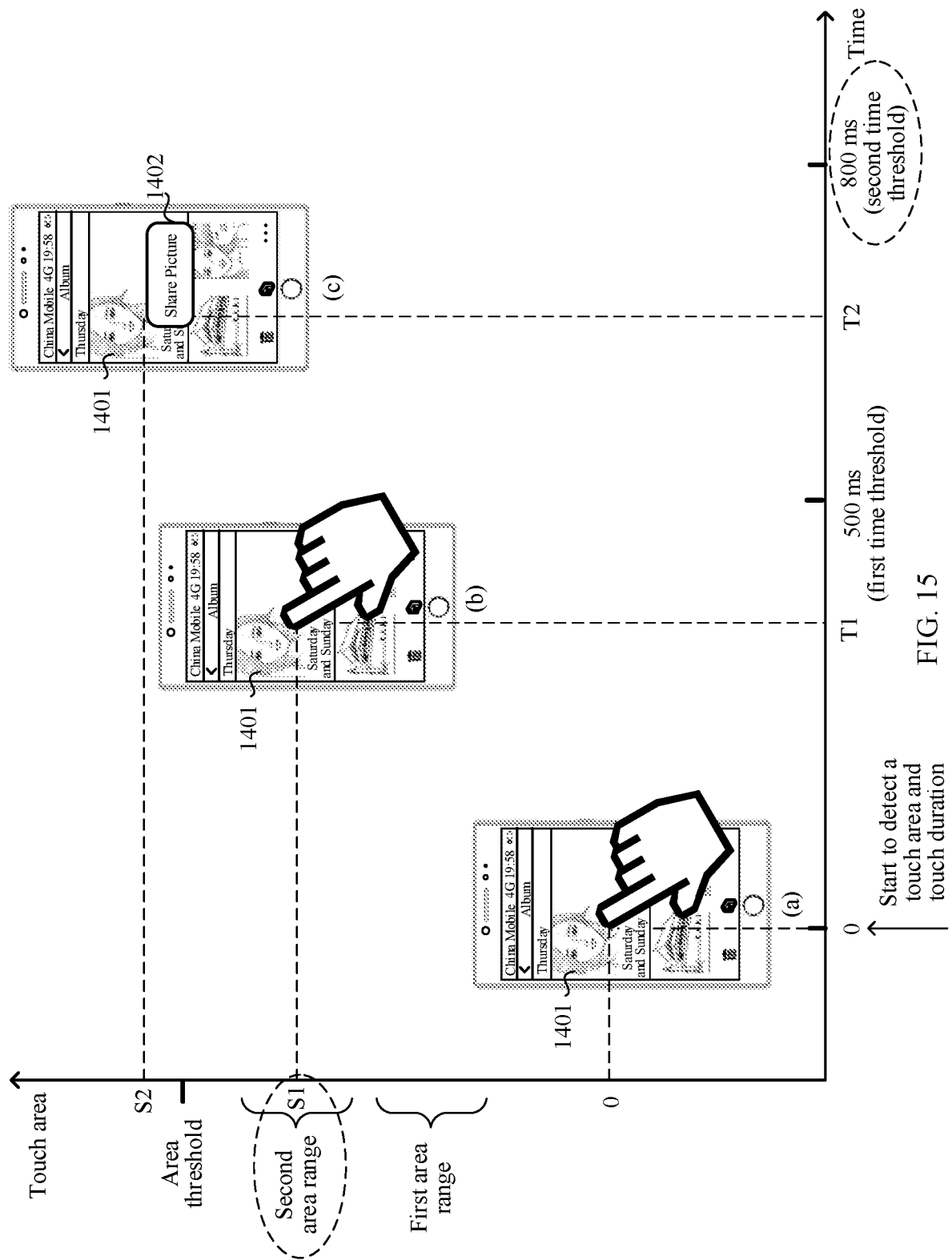
FIG. 15 is a schematic diagram 6 of an application scenario of a touch method according to an embodiment of this application.

Further, as shown in FIG. 15, the terminal may further preset a plurality of area ranges, for example, a first area range and a second area range in FIG. 15, where a lower limit of the second area range is greater than or equal to an upper limit of the first area range, and a second time threshold corresponding to the second area range is 800 ms.

In this case, still as shown in FIG. 15, if it is detected at a time T1 (0 ms<T1<500 ms) that the touch area S1 between the finger of the user and the touchscreen falls within the second area range, it indicates that the touch area between the finger of the user and the touchscreen increases faster within a short time, in comparison with the touch scenario shown in FIG. 14. To be specific, the intention of performing the area change gesture by the user is more obvious in this case. Therefore, the terminal may extend the default first time threshold to 800 ms (the second time threshold) having a looser time limit, to further reduce a probability that the terminal incorrectly determines the area change gesture as the touch-and-hold gesture.

In addition, the following step S1302b is an optional alternative method for step S1302a. To be specific, there may be a plurality of conditions for triggering the terminal to adjust the first time threshold for recognizing the touch-and-hold gesture to the second time threshold. This is not limited in this embodiment of this application.

S1302b. If detecting, within a first time threshold, that an increase speed of the touch area between the finger of the user and the touchscreen is greater than a preset speed, the terminal uses a second time threshold as a time threshold for recognizing the touch-and-hold gesture.

Figure 16:
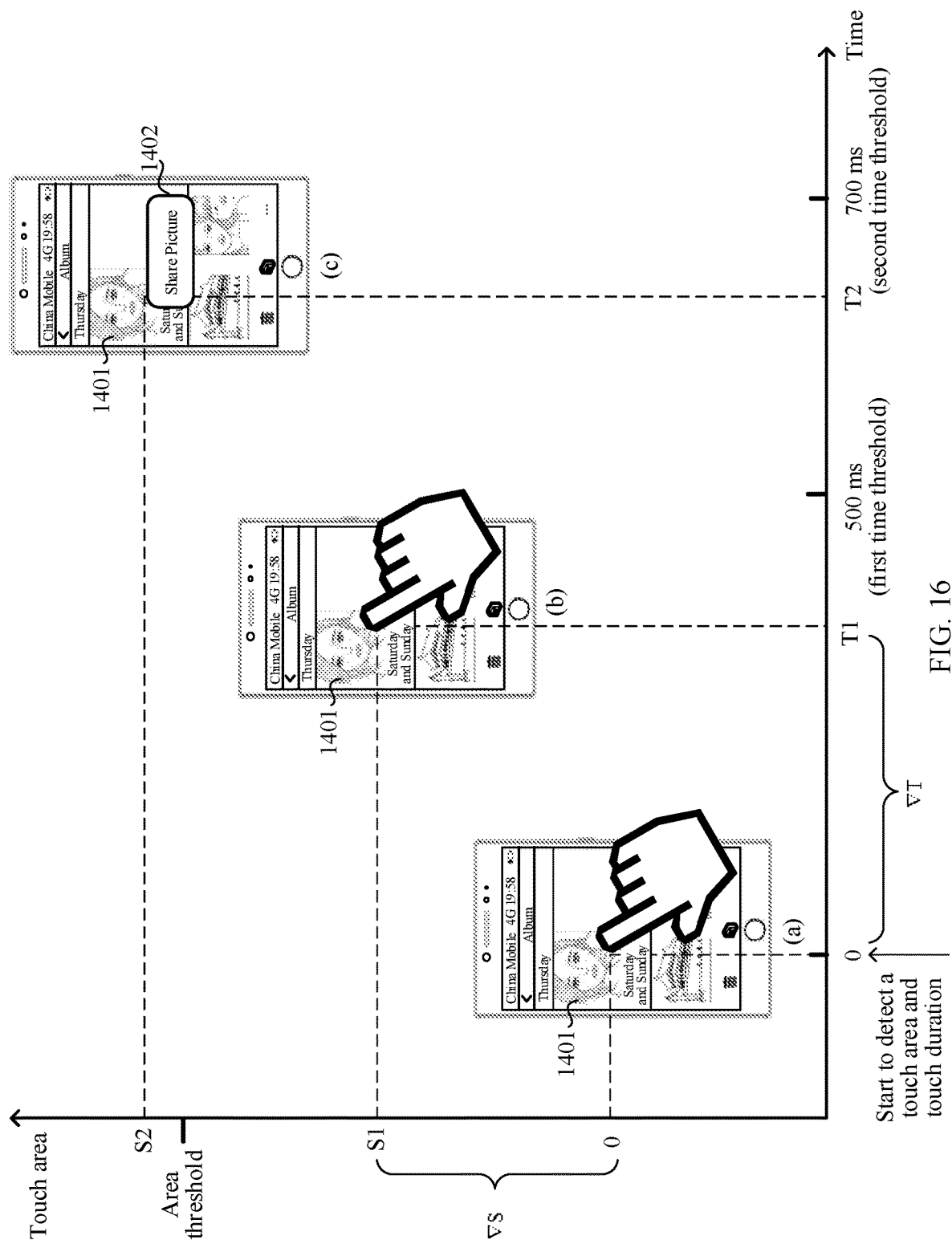
FIG. 16 is a schematic diagram 7 of an application scenario of a touch method according to an embodiment of this application.

Different from the foregoing step S802a, as shown in FIG. 16, within the first time threshold 500 ms, if it is detected, within a time ∇T, that a change ∇S of the touch area S between the finger of the user and the touchscreen is greater than a preset area, that is, an increase speed of the touch area S between the finger of the user and the touchscreen is greater than the preset speed, it may also indicate that the touch intention of the user in this case is to perform the area change gesture.

Therefore, to reduce a probability that the terminal incorrectly determines the area change gesture as the touch-and-hold gesture, the terminal may extend the default first time threshold to the second time threshold having a relatively loose time limit (the second time threshold is greater than the first time threshold). For example, in FIG. 16, the terminal extends the first time threshold 500 ms to the second time threshold 700 ms.

S1303 (optional). If detecting, within the second time threshold, that a touch area S2 between the finger of the user and the touchscreen still has a trend of increasing to the area threshold, the terminal uses a third time threshold as the time threshold for recognizing the touch-and-hold gesture.

Further, after the terminal adjusts the first time threshold for recognizing the touch-and-hold gesture to the second time threshold, and before the second time threshold is reached, if detecting that the touch area S between the finger of the user and the touchscreen does not reach the preset area threshold, the terminal still continues to detect the touch area S between the finger of the user and the touchscreen and duration T of touching the touchscreen by the finger of the user.

Figure 17:
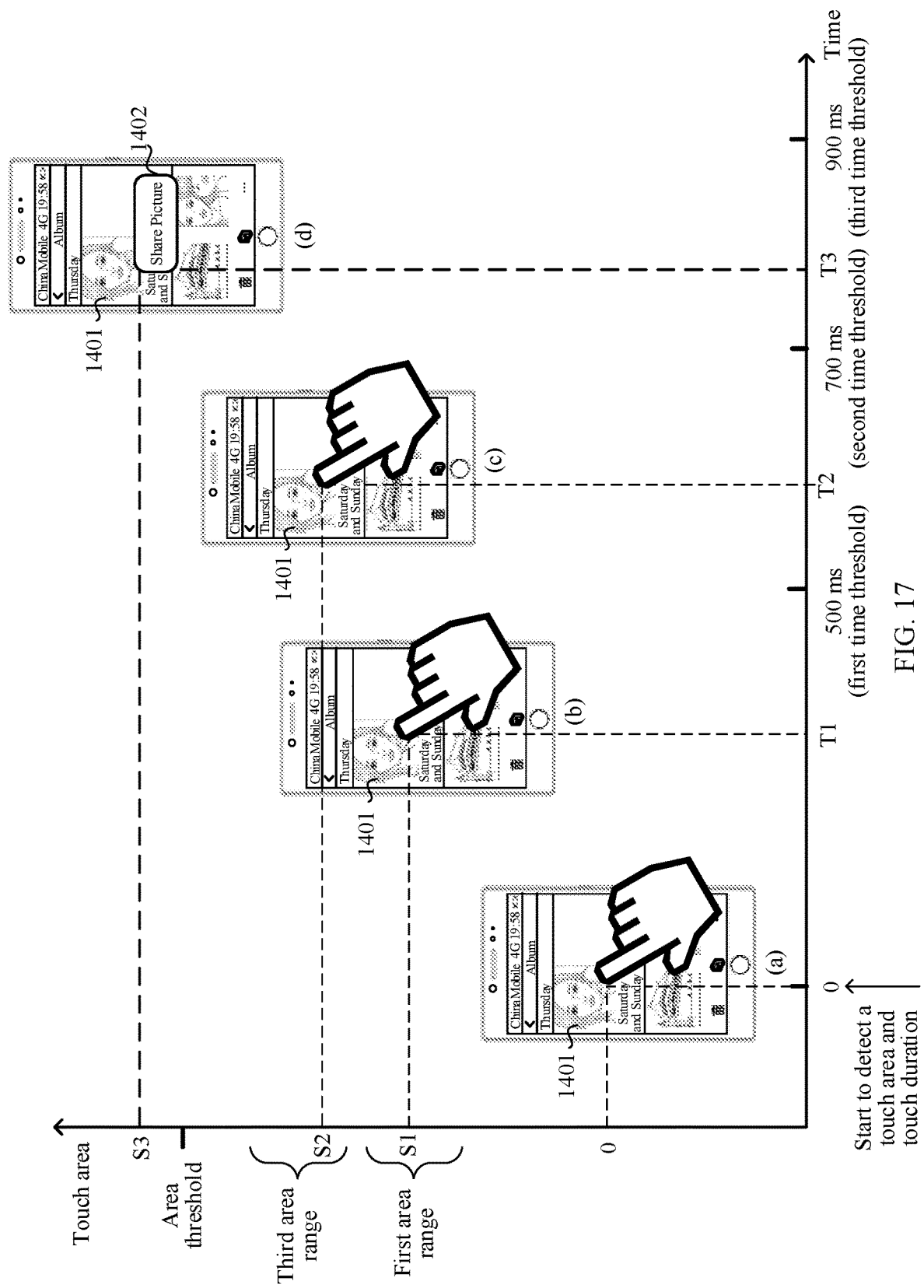
FIG. 17 is a schematic diagram 8 of an application scenario of a touch method according to an embodiment of this application.

In this case, as shown in (c) of FIG. 17, if it is detected, within the second time threshold 700 ms, that the touch area S2 between the finger of the user and the touchscreen falls within a third area range closer to the area threshold (a lower limit of the third area range is greater than an upper limit of the first area range), it indicates that the user still continues to increase the touch area when touching the touchscreen, that is, the touch intention of the user is still to perform the area change gesture.

Therefore, to reduce a probability that the terminal incorrectly determines the area change gesture as the touch-and-hold gesture, the terminal may further extend the second time threshold for recognizing the touch-and-hold gesture in this case to the third time threshold (the third time threshold is greater than the second time threshold). For example, in FIG. 17, the terminal extends the second time threshold 700 ms to the third time threshold 900 ms.

Certainly, the terminal may preset an upper time limit for the time threshold for recognizing the touch-and-hold gesture. For example, the upper time limit is 1000 ms. This is because if the area value of pressing the touchscreen by the user within 1000 ms does not reach the area threshold, it indicates that the touch intention of the user in this case is probably not to perform the area change gesture. Therefore, after the terminal extends the time threshold for recognizing the touch-and-hold gesture to 1000 ms, the terminal does not continue to extend the time threshold any longer, to avoid interference caused by unlimited extension of the time threshold on recognition of another touch gesture by the terminal.

S1304. If detecting, within the second time threshold (or the third time threshold), that the touch area between the finger of the user and the touchscreen reaches the area threshold, the terminal displays the second touch object and the shortcut function corresponding to the area change gesture.

Specifically, as shown in (c) of FIG. 14 to FIG. 16, or (d) of FIG. 17, within the extended second time threshold (or the third time threshold), if detecting that the touch area S between the finger of the user and the touchscreen reaches the area threshold, the terminal may determine that the touch gesture currently entered by the user on the image 1401 is the area change gesture. In this case, the terminal may be triggered to display the image 1401 and the shortcut function corresponding to the area change gesture, for example, a shortcut menu 1402 having a "sharing picture" function shown in (c) of FIG. 14 to FIG. 16, or (d) of FIG. 17.

S1305. The terminal restores the time threshold for recognizing the touch-and-hold gesture to the first time threshold.

Similarly to step S805, in step S1305, after the terminal recognizes that the touch gesture currently entered by the user on the first touch object is the area change gesture, if the time threshold for recognizing the touch-and-hold gesture is extended in this case, for example, if the terminal extends the first time threshold 500 ms for recognizing the touch-and-hold gesture to the second time threshold 700 ms in FIG. 14, the terminal may restore the second time threshold to the default first time threshold 500 ms of the terminal.

Therefore, when the user enters a touch gesture on a touch object (for example, a file of an application) again subsequently, if the touch object is the second touch object supporting the touch-and-hold gesture and the area change gesture, the terminal may still repeat the foregoing steps S1301 to S1305 to recognize and respond to the touch gesture, to reduce a probability that the terminal incorrectly determines the area change gesture as the touch-and-hold gesture.

In other embodiments of this application, when the finger of the user touches the second touch object, if the terminal can recognize, within the first time threshold (for example, 500 ms), the touch intention of performing the area change gesture by the user, when the touch duration reaches the first time threshold 500 ms for recognizing the touch-and-hold gesture, without changing the first time threshold 500 ms, the terminal may temporarily not report, to the application to which the first touch object belongs, that the gesture performed by the user is the touch-and-hold gesture. In this case, the terminal may continue to determine whether the touch area detected within the second time threshold (for example, 700 ms) reaches the area threshold.

If the touch area reaches the area threshold, it indicates that the touch gesture performed by the user is the area change gesture. In this case, the terminal may further report the area change gesture to the application to which the second touch object belongs, to present the shortcut function corresponding to the area change gesture.

Correspondingly, if the area threshold is not reached, it indicates that the touch area increased by the user within 500 ms may be caused by an unintentional operation, and that an actual touch intention of the user is to perform the touch-and-hold gesture. In this case, the terminal may further report the touch-and-hold gesture to the application to which the second touch object belongs, to present a shortcut function corresponding to the touch-and-hold gesture.

Figure 18A:
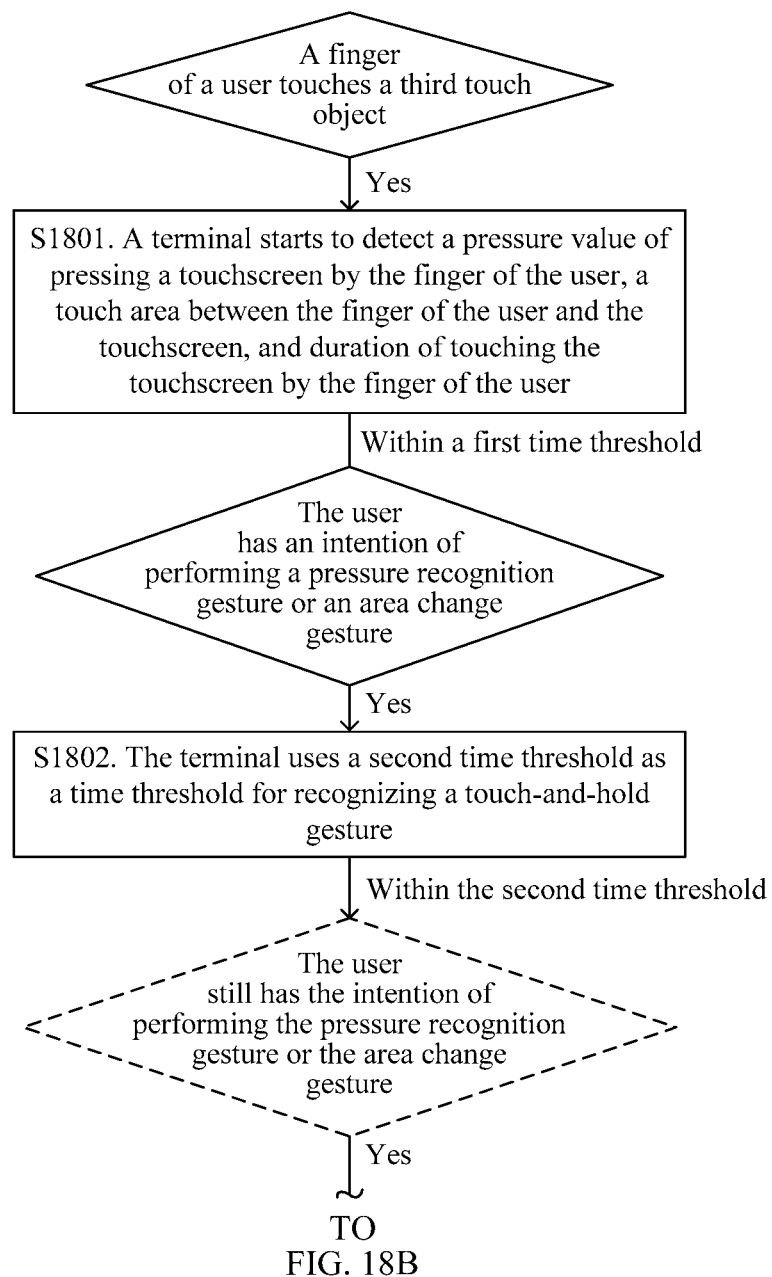
FIG. 18A and FIG. 18B are a schematic flowchart 3 of a touch method according to an embodiment of this application.
Figure 18B:
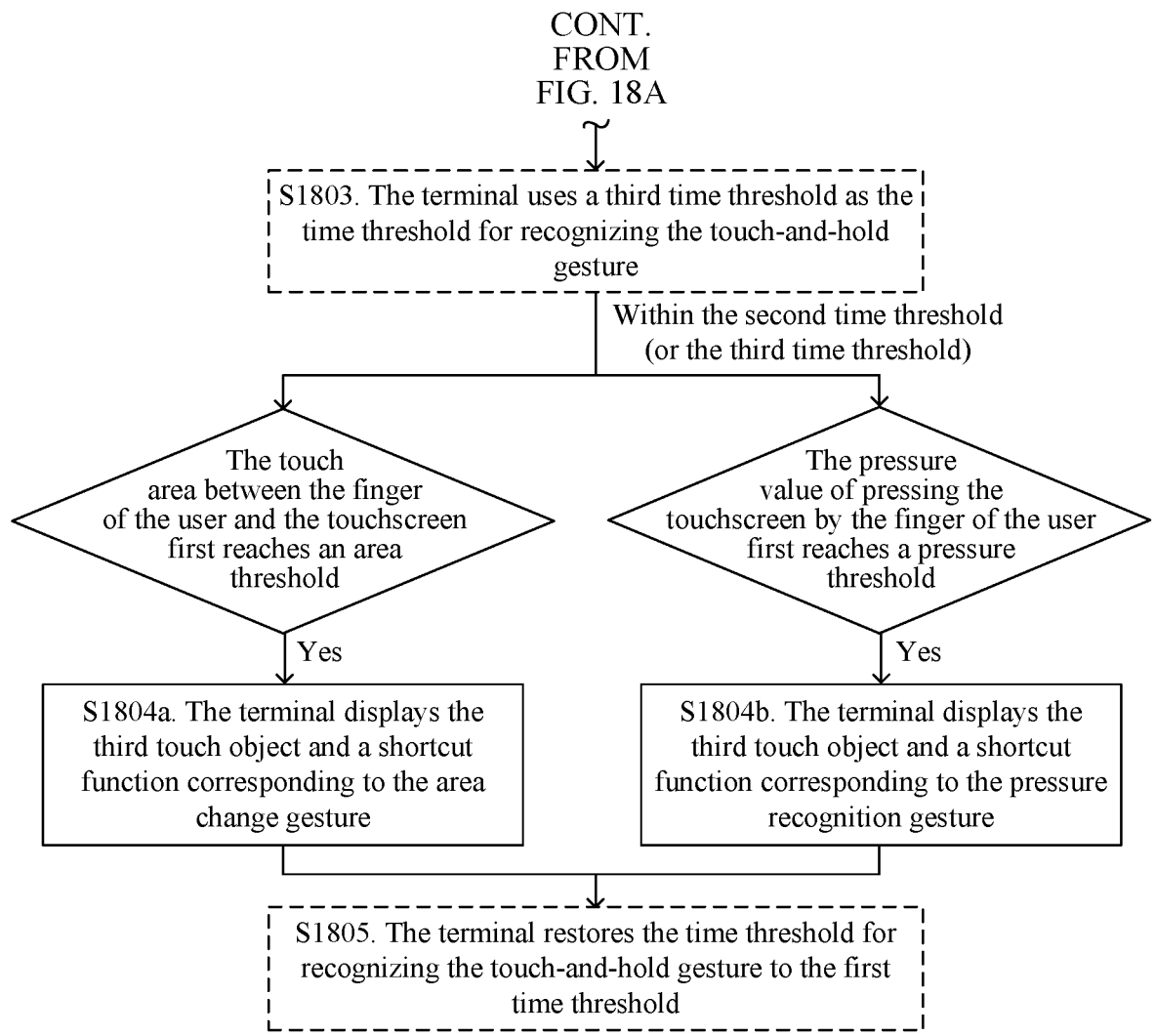

In some embodiments of this application, as shown in FIG. 18A and FIG. 18B, a touch method provided by an embodiment of this application includes the following steps.

S1801. When detecting that a finger of a user touches a third touch object, a terminal starts to detect a pressure value of pressing a touchscreen by the finger of the user, a touch area between the finger of the user and the touchscreen, and duration of touching the touchscreen by the finger of the user.

Different from the foregoing steps S801 and S1301, the third touch object is a control element supporting three touch gestures: an area change gesture, a pressure recognition gesture, and a touch-and-hold gesture. Likewise, the third touch object may also be an application icon, a file included in an application, a window in an application, or the like. This is not limited in this embodiment of this application.

S1802. Within a first time threshold, if determining that the user has an intention of performing the pressure recognition gesture or the area change gesture, the terminal uses a second time threshold as a time threshold for recognizing the touch-and-hold gesture.

Likewise, in step S1802, the first time threshold may be a default value when the terminal recognizes a touch-and-hold gesture, or may be a time threshold used when a touch-and-hold gesture entered by the user is recognized previously. For example, if the first time threshold is 500 ms, within 500 ms after the finger of the user touches the third touch object, if the terminal recognizes that a touch intention of the user is the pressure recognition gesture (or the area change gesture), to avoid interference generated by the touch-and-hold gesture on recognizing the pressure recognition gesture (or the area change gesture) by the terminal, the terminal may extend the default first time threshold to a second time threshold that has a relatively loose time limit (the second time threshold is greater than the first time threshold).

Specifically, referring to related descriptions in step S802, when the terminal first detects that the pressure value P of pressing the touchscreen by the finger of the user is within the foregoing first pressure range, or first detects that an increase speed of the pressure value P of pressing the touchscreen by the finger of the user is greater than the foregoing preset speed, it may be determined that the user has an intention of performing the pressure recognition gesture. In this case, referring to related descriptions in step S802a or S802b, the terminal adjusts the first time threshold for recognizing the touch-and-hold gesture to the second time threshold based on a preset correspondence or function relationship between the touch pressure and the touch-and-hold gesture.

Correspondingly, referring to related descriptions in step S1302, when the terminal first detects that a touch area S between the finger of the user and the touchscreen is within the foregoing first area range, or first detects that an increase speed of a touch area S between the finger of the user and the touchscreen is greater than the foregoing preset speed, it may be determined that the user has an intention of performing the area change gesture. In this case, referring to the related descriptions in step S1302a or S1302b, the terminal adjusts the first time threshold for recognizing the touch-and-hold gesture to the second time threshold based on a preset correspondence or function relationship between the touch area and the touch-and-hold gesture.

In this case, if the terminal simultaneously detects that the terminal has an intention of performing the pressure recognition gesture and an intention of performing the area change gesture, for example, if the terminal detects, at a time T1, that a pressure value P1 of pressing the touchscreen by the finger of the user falls within the first pressure range, and the terminal detects, at the time T1, that a touch area S1 between the finger of the user and the touchscreen falls within the first area range, assuming that a second time threshold corresponding to the first pressure range is 700 ms, but a second time threshold corresponding to the first area range is 800 ms, the terminal may select 800 ms that has a looser time limit as the time threshold for recognizing the touch-and-hold gesture. Therefore, more sufficient time can be reserved for the terminal to recognize whether the touch gesture entered by the user is the pressure recognition gesture or the area change gesture.

S1803 (optional). Within the second time threshold, if detecting that the user still has the intention of performing the pressure recognition gesture or the area change gesture, the terminal uses a third time threshold as the time threshold for recognizing the touch-and-hold gesture.

With reference to related descriptions in step S803 and step S1303, after the terminal adjusts the first time threshold for recognizing the touch-and-hold gesture to the second time threshold, and before the second time threshold is reached, if the pressure value P of pressing the touchscreen by the finger of the user does not reach a preset pressure threshold, or the touch area S1 between the finger of the user and the touchscreen does not reach a preset area threshold, the terminal cannot recognize the specific touch gesture performed by the user in this case, so the terminal still continues to detect the pressure value P of pressing the touchscreen by the finger of the user and the touch area S between the finger of the user and the touchscreen.

In this case, if it is detected that a touch area S2 between the finger of the user and the touchscreen still has a trend of increasing to the area threshold, it indicates that the user still continues to increase the touch area when touching the touchscreen. In this case, the terminal may further extend the second time threshold for recognizing the touch-and-hold gesture in this case to the third time threshold (the third time threshold is greater than the second time threshold), to reduce a probability that the terminal incorrectly determines the area change gesture as the touch-and-hold gesture.

Likewise, if it is detected that a pressure value P2 of pressing the touchscreen by the finger of the user still has a trend of increasing to the pressure threshold, it indicates that the user still continues to increase the pressure of pressing the touchscreen. In this case, the terminal may further extend the second time threshold for recognizing the touch-and-hold gesture in this case to the third time threshold (the third time threshold is greater than the second time threshold), to reduce a probability that the terminal incorrectly determines the pressure recognition gesture as the touch-and-hold gesture.

S1804a. If the touch area between the finger of the user and the touchscreen first reaches the area threshold within the second time threshold (or the third time threshold), the terminal displays the third touch object and a shortcut function corresponding to the area change gesture.

If the touch area between the finger of the user and the touchscreen first reaches the area threshold within the second time threshold (or the third time threshold), it indicates that the touch gesture performed by the user is the area change gesture. In this case, as in step S1304, the terminal may be triggered to display the third touch object and the shortcut function corresponding to the area change gesture.

S1804b. If the pressure value of pressing the touchscreen by the finger of the user first reaches the pressure threshold within the second time threshold (or the third time threshold), the terminal displays the third touch object and a shortcut function corresponding to the pressure recognition gesture.

If the pressure value of pressing the touchscreen by the finger of the user first reaches the pressure threshold within the second time threshold (or the third time threshold), it indicates that the touch gesture performed by the user is the pressure recognition gesture. In this case, as in step S804, the terminal may be triggered to display the third touch object and the shortcut function corresponding to the pressure recognition gesture.

S1805. The terminal restores the time threshold for recognizing the touch-and-hold gesture to the first time threshold.

As in the foregoing steps S805 and S1305, after the terminal recognizes that the touch gesture currently entered by the user on the third touch object is the area change gesture or the pressure recognition gesture, the time threshold for recognizing the touch-and-hold gesture may be restored to the default first time threshold of the terminal, and subsequently the terminal may continue to use the first time threshold as a start point to adjust the time threshold for recognizing the touch-and-hold gesture.

In other embodiments of this application, when the finger of the user touches the third touch object, if the terminal can recognize, within the first time threshold (for example, 500 ms), the touch intention of performing the area change gesture by the user or the touch intention of performing the pressure recognition gesture by the user, when the touch duration reaches the first time threshold 500 ms for recognizing the touch-and-hold gesture, without changing the first time threshold 500 ms, the terminal may temporarily not report, to the application to which the first touch object belongs, that the gesture performed by the user is the touch-and-hold gesture. In this case, the terminal may continue to determine whether the touch area or pressure value detected within the second time threshold (for example, 700 ms) reaches the threshold corresponding to the touch area or pressure value.

If it is detected, within 700 ms, that the touch area first reaches the area threshold, it indicates that the touch gesture performed by the user is the area change gesture. In this case, the terminal may further report the area change gesture to the application to which the third touch object belongs, to present the shortcut function corresponding to the area change gesture.

If it is detected, within 700 ms, that the pressure value first reaches the pressure threshold, it indicates that the touch gesture performed by the user is the pressure recognition gesture. In this case, the terminal may further report the pressure recognition gesture to the application to which the third touch object belongs, to present the shortcut function corresponding to the pressure recognition gesture.

Correspondingly, within 700 ms, if the touch area does not reach the area threshold and the pressure value does not reach the pressure threshold either, it indicates that an actual touch intention of the user is to perform the touch-and-hold gesture. In this case, the terminal may further report the touch-and-hold gesture to the application to which the third touch object belongs, to present a shortcut function corresponding to the touch-and-hold gesture.

Figure 19A:
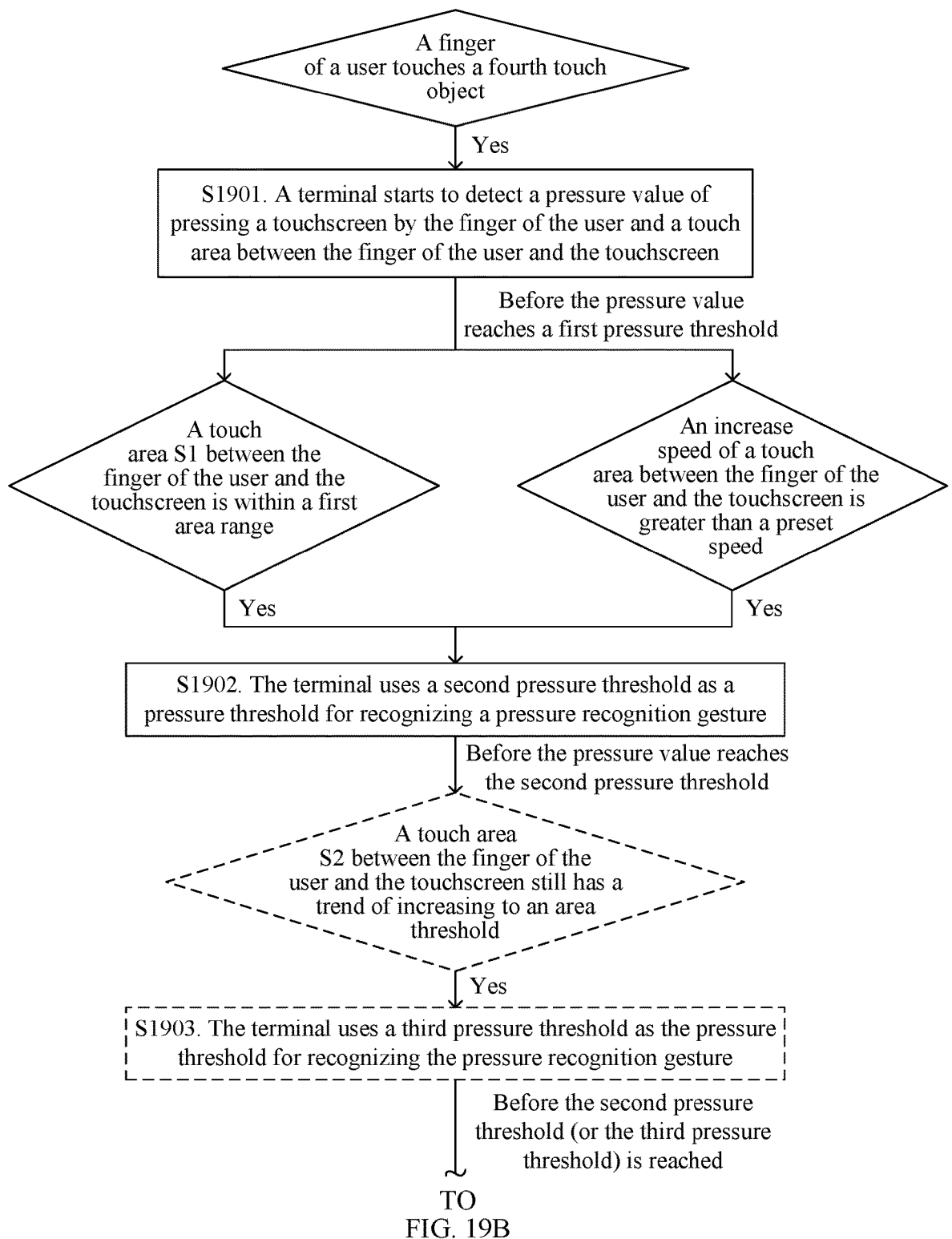
FIG. 19A and FIG. 19B are a schematic flowchart 4 of a touch method according to an embodiment of this application.
Figure 19B:
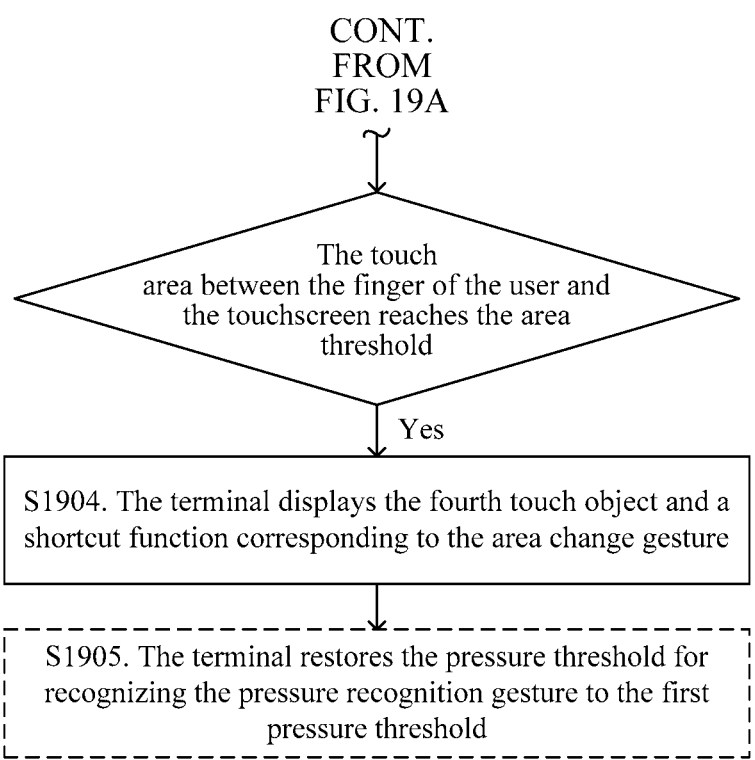

In some embodiments of this application, as shown in FIG. 19A and FIG. 19B, a touch method provided by an embodiment of this application includes the following steps.

S1901. When detecting that a finger of a user touches a fourth touch object, a terminal starts to detect a pressure value of pressing a touchscreen by the finger of the user and a touch area between the finger of the user and the touchscreen.

The fourth touch object is a control element supporting an area change gesture and a pressure recognition gesture. Similar to the first touch object, the second touch object, and the third touch object, the fourth touch object may also be an application icon, a file included in an application, a window in an application, or the like. This is not limited in this embodiment of this application.

Figure 20:
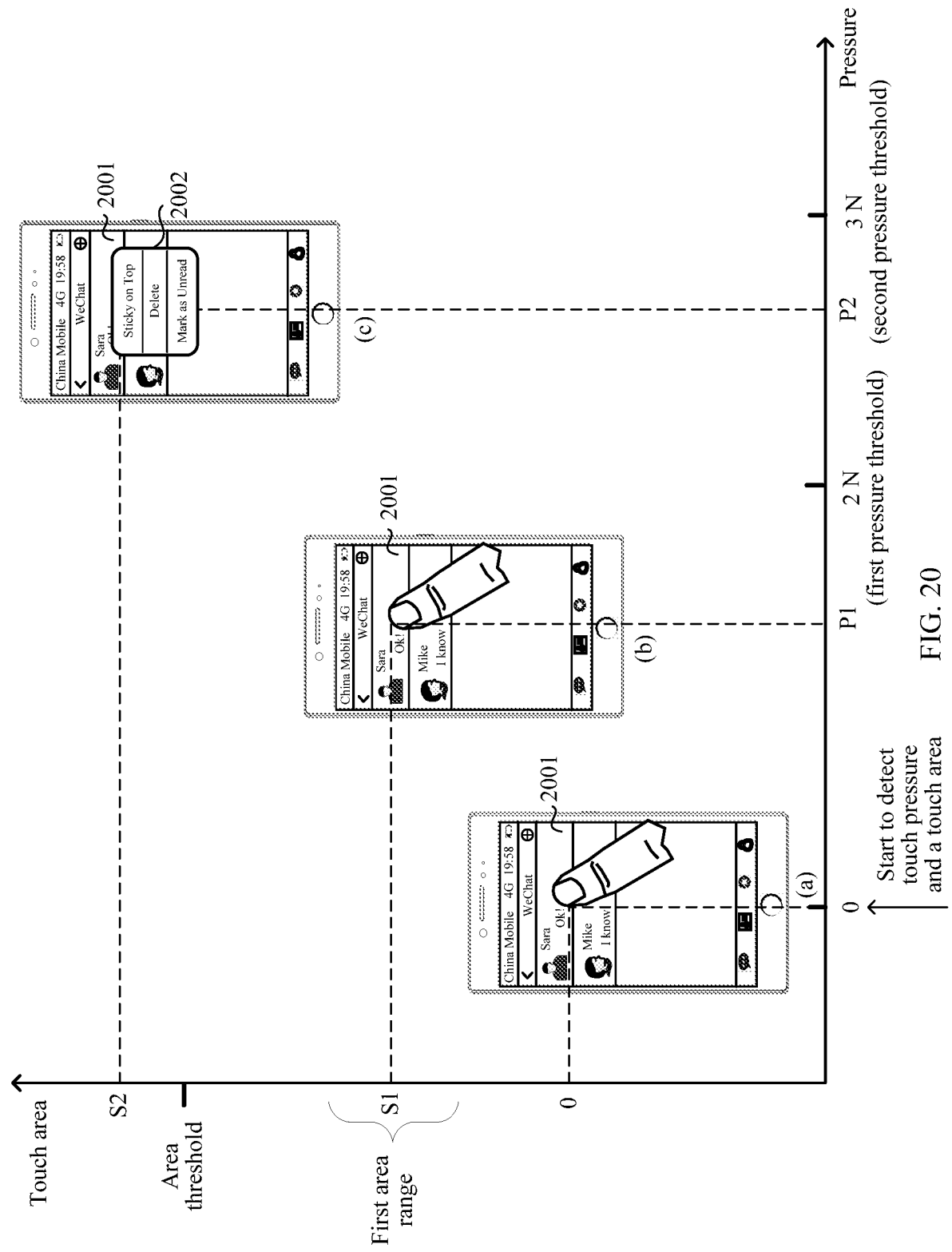
FIG. 20 is a schematic diagram 9 of an application scenario of a touch method according to an embodiment of this application.

As shown in FIG. 20, for example, a chat window 2001 for chatting with Sara in a WeChat application is used as the fourth touch object. In (a) of FIG. 20, when detecting that the finger of the user touches the chat window 2001, the terminal may determine, based on a touch gesture preregistered when the WeChat application is installed, whether the current touch object (that is, the chat window 2001) is the fourth touch object.

If the chat window 2001 is the fourth touch object supporting not only the area change gesture but also the pressure recognition gesture, to avoid incorrect determining when the terminal recognizes the two touch gestures, the terminal may be triggered to start to obtain in real time a touch area S (S≥0) between the finger of the user and the touchscreen and a pressure value P (P≥0) of pressing the touchscreen, so that the terminal recognizes a touch intention of the user based on changes of the touch area S and the pressure value P.

S1902a. If detecting, before a first pressure threshold is reached, that a touch area S1 between the finger of the user and the touchscreen is within a first area range, the terminal uses a second pressure threshold as a pressure threshold for recognizing the pressure recognition gesture.

The first pressure threshold may be a default value when the terminal recognizes a pressure recognition gesture, and the first pressure threshold is generally stored in a memory of the terminal as a default parameter when the terminal is delivered. As shown in FIG. 20, the first pressure threshold may be 2 N (Newton). To be specific, by default (for example, the chat window 2001 supports only the pressure recognition gesture), if the terminal detects that the pressure value P of pressing the touchscreen by the finger of the user reaches 2 N, the terminal may recognize that the touch gesture entered by the user is the pressure recognition gesture.

Alternatively, the terminal may further pre-store a plurality of time thresholds for recognizing the pressure recognition gesture, for example, 1 N, 2N, and 3 N. In this case, the first pressure threshold may be a pressure threshold used when a pressure recognition gesture entered by the user is recognized previously. In this case, in step S1902a, the terminal may determine one (that is, the second pressure threshold) from 1 N, 2N, and 3 N based on the currently detected touch area between the finger of the user and the touchscreen, as the pressure threshold for recognizing the pressure recognition gesture currently.

In addition, an upper limit of the first area range is less than the foregoing area threshold for recognizing the area change gesture by the terminal, and a lower limit of the first area range is greater than 0. The lower limit of the first area range may be set to a touch area between an ordinary touch operation and the touchscreen or set to be greater than a touch area between an ordinary touch operation and the touchscreen. A person skilled in the art may set the upper limit and the lower limit of the first area range based on actual experience or an actual application scenario, or the terminal may obtain the upper limit and the lower limit of the first area range through self-learning based on an operation habit of the user on the touchscreen. This is not limited in this embodiment of this application.

Generally, the pressure value of pressing the touchscreen tends to fluctuate greatly when the user performs the area change gesture, but the touch area fluctuates slightly when the user performs the pressure recognition gesture. Therefore, when it is detected that the touch area S between the finger of the user and the touchscreen falls within the first area range, it indicates that the touch area between the finger of the user and the touchscreen increases, and that the user may intentionally perform the area change gesture.

In this case, as shown in (b) of FIG. 20, before the detected pressure value P reaches the first pressure threshold 2 N, if it is detected that the touch area S1 between the finger of the user and the touchscreen falls within the first area range, it indicates that the touch intention of the user is to perform the area change gesture. In this case, the terminal may extend the default first pressure threshold to the second pressure threshold that has a relatively loose pressure limit (the second pressure threshold is greater than the first pressure threshold). For example, the terminal extends the first pressure threshold 2 N to the second pressure threshold 3 N in FIG. 20.

Therefore, if the touch area S between the finger of the user and the touchscreen reaches the pressure threshold before the pressure value P reaches the second pressure threshold 3 N, the terminal may be triggered to display the chat window 2001 and a shortcut function corresponding to the area change gesture, to reduce a probability that the terminal incorrectly determines the area change gesture as the pressure recognition gesture.

Optionally, a correspondence between the first area range and the second pressure threshold may be preset in the terminal. For example, when the first area range is 50 to 65 pixels, the corresponding second pressure threshold may be set to 3 N; or when the first area range is 65 to 80 pixels, the corresponding second pressure threshold may be set to 3.5 N. This is not limited in this embodiment of this application.

In this case, when the terminal detects that the touch area S between the finger of the user and the touchscreen falls within the first area range, the specific second pressure threshold may be determined based on the correspondence, so that the first pressure threshold is adjusted to the second pressure threshold.

Alternatively, a function relationship between the second pressure threshold and the touch area S between the finger of the user and the touchscreen: y4(second pressure threshold)=F(S) may be preset in the terminal. Therefore, when the terminal detects that the touch area S between the finger of the user and the touchscreen falls within the first area range, the touch area S may be substituted into the function relationship to obtain the specific second pressure threshold through calculation, so that the first pressure threshold is adjusted to the second pressure threshold.

Certainly, the function relationship may be a linear function relationship, a non-linear function relationship, or a weighting function relationship. A person skilled in the art may set the function relationship based on actual experience or an actual application scenario.

Figure 21:
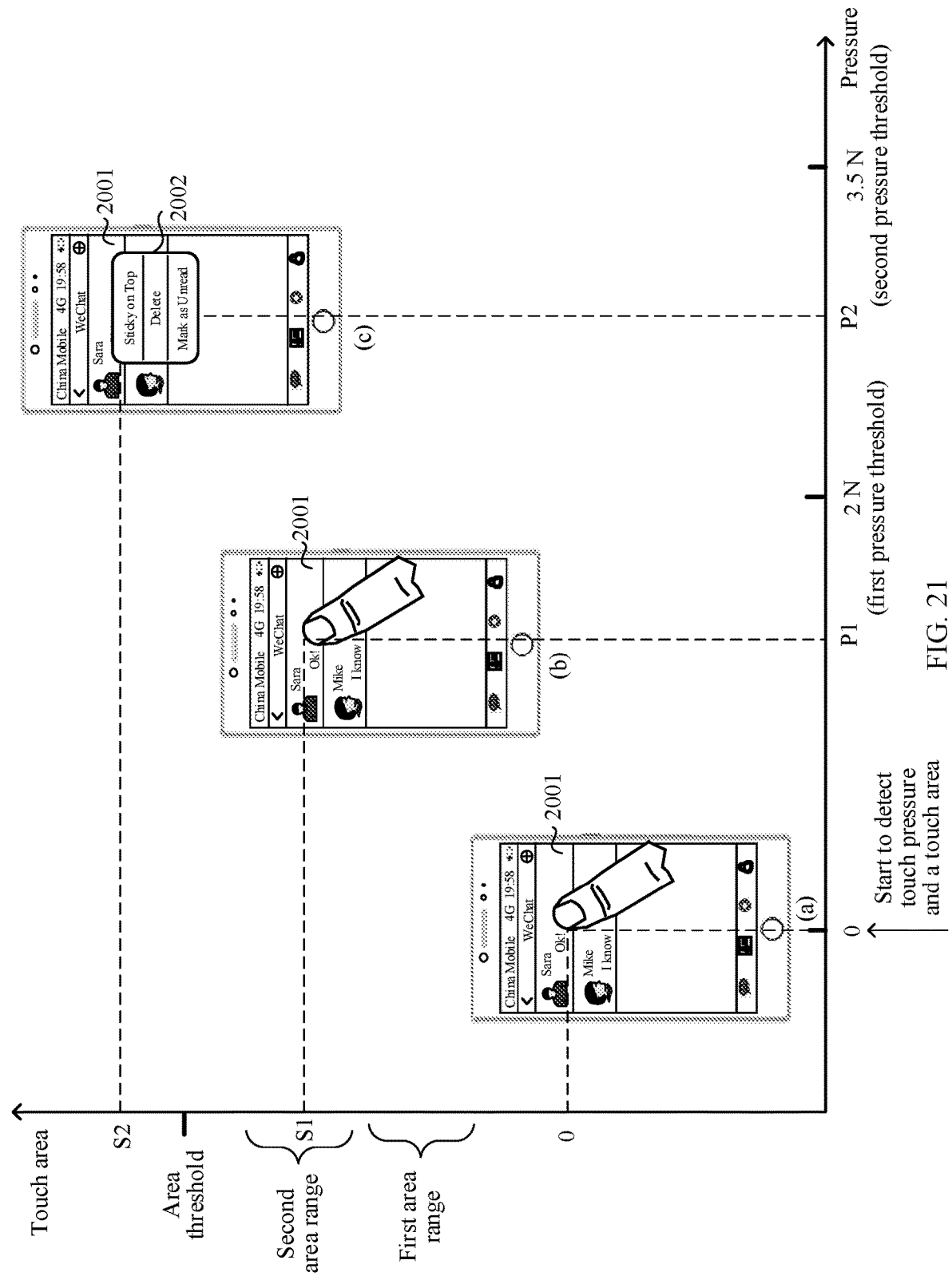
FIG. 21 is a schematic diagram 10 of an application scenario of a touch method according to an embodiment of this application.

Further, as shown in FIG. 21, the terminal may further preset a plurality of area ranges, for example, a first area range and a second area range in FIG. 21, where a lower limit of the second area range is greater than or equal to an upper limit of the first area range, and a second pressure threshold corresponding to the second area range is 3.5 N.

In this case, still as shown in FIG. 21, if it is detected, before the pressure value P reaches the first pressure threshold 2 N, that the touch area S1 between the finger of the user and the touchscreen falls within the second area range, it indicates that the touch area between the finger of the user and the touchscreen increases faster within a short time, in comparison with the touch scenario shown in FIG. 20. To be specific, the intention of performing the area change gesture by the user is more obvious in this case. Therefore, the terminal may extend the default first pressure threshold to 3.5 N (the second pressure threshold) having a looser limit, to further reduce a probability that the terminal incorrectly determines the area change gesture as the pressure recognition gesture.

In addition, the following step S1902b is an optional alternative method for step S1902a. To be specific, there may be a plurality of conditions for triggering the terminal to adjust the first pressure threshold for recognizing the pressure recognition gesture to the second pressure threshold. This is not limited in this embodiment of this application.

S1902b. If detecting, before a first pressure threshold is reached, that an increase speed of a touch area S1 between the finger of the user and the touchscreen is greater than a preset speed, the terminal uses a second pressure threshold as a pressure threshold for recognizing the pressure recognition gesture.

Different from the foregoing step S1902a, before the pressure value P reaches the first pressure threshold 2 N, if it is detected, within a time ∇T, that a change ∇S of the touch area S between the finger of the user and the touchscreen is greater than a preset area, that is, the increase speed of the touch area S between the finger of the user and the touchscreen is greater than the preset speed, it may also indicate that the touch intention of the user in this case is to perform the area change gesture.

Therefore, to reduce a probability that the terminal incorrectly determines the area change gesture as the pressure recognition gesture, the terminal may extend the default first pressure threshold to the second pressure threshold having a relatively loose limit (the second pressure threshold is greater than the first pressure threshold).

S1903 (optional). If detecting, before the second pressure threshold is reached, that a touch area S2 between the finger of the user and the touchscreen still has a trend of increasing to the area threshold, the terminal uses a third pressure threshold as the pressure threshold for recognizing the pressure recognition gesture.

Further, after the terminal adjusts the first pressure threshold for recognizing the pressure recognition gesture to the second pressure threshold, and before the detected pressure value P reaches the second pressure threshold, if the touch area S between the finger of the user and the touchscreen does not reach the preset area threshold, the terminal still continues to detect the touch area between the finger of the user and the touchscreen.

Figure 22:
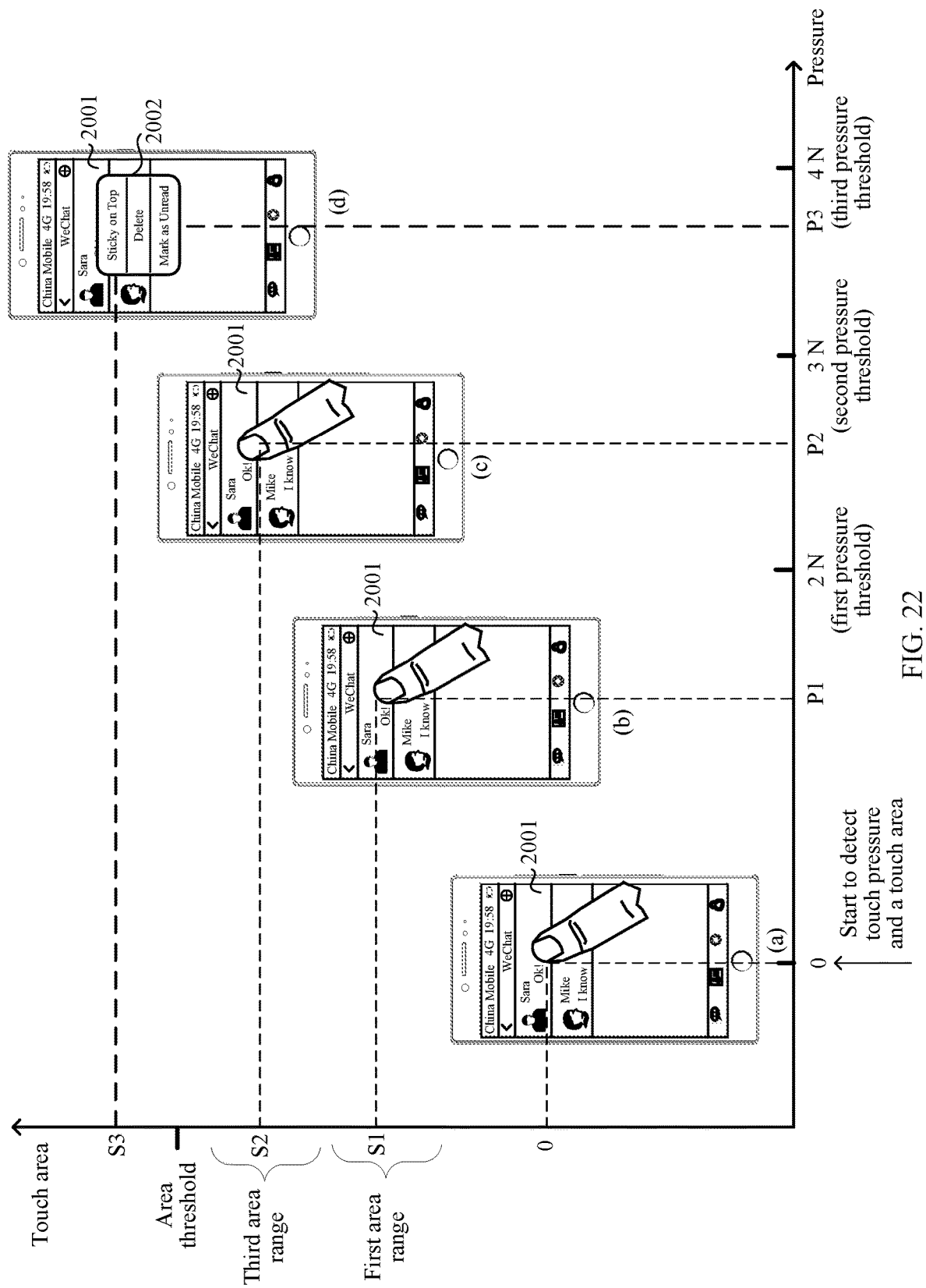
FIG. 22 is a schematic diagram 11 of an application scenario of a touch method according to an embodiment of this application.

In this case, as shown in (c) of FIG. 22, before the pressure value P reaches the second pressure threshold 3 N, if it is detected that the touch area S2 between the finger of the user and the touchscreen falls within a third area range closer to the area threshold (a lower limit of the third area range is greater than an upper limit of the first area range), it indicates that the user still continues to increase the touch area when touching the touchscreen, that is, the touch intention of the user is still to perform the area change gesture.

Therefore, to reduce a probability that the terminal incorrectly determines the area change gesture as the pressure recognition gesture, the terminal may further extend the second pressure threshold for recognizing the pressure recognition gesture in this case to the third pressure threshold (the third pressure threshold is greater than the second pressure threshold). For example, in FIG. 22, the terminal extends the second pressure threshold 3 N to the third pressure threshold 4 N.

Certainly, the terminal may preset an upper pressure limit for the pressure threshold for recognizing the pressure recognition gesture. For example, the upper pressure limit is 5 N. This is because if the touch area between the finger of the user and the touchscreen does not reach the area threshold within 5 N pressure, it indicates that the touch intention of the user in this case is probably not to perform the area change gesture. Therefore, after the terminal extends the pressure threshold for recognizing the pressure recognition gesture to 5 N, the terminal does not continue to extend the pressure threshold any longer, to avoid interference caused by unlimited extension of the pressure threshold on recognition of another touch gesture.

S1904. Before the second pressure threshold (or the third pressure threshold) is reached, if detecting that the touch area between the finger of the user and the touchscreen reaches the area threshold, the terminal displays the fourth touch object and the shortcut function corresponding to the area change gesture.

Specifically, as shown in (c) of FIG. 20 or FIG. 21, or (d) of FIG. 22, before the pressure value P reaches the extended second pressure threshold (or the third pressure threshold), if detecting that the touch area S between the finger of the user and the touchscreen reaches the area threshold, the terminal may determine that the touch gesture entered by the user in the chat window 2001 is the area change gesture. In this case, the terminal may be triggered to display the chat window 2001 and the shortcut function corresponding to the area change gesture, for example, a shortcut menu 2002 shown in (c) of FIG. 20 or FIG. 21, or (d) of FIG. 22.

S1905. The terminal restores the pressure threshold for recognizing the pressure recognition gesture to the first pressure threshold.

Similarly to steps S805, S1305, and S1805, in step S1905, after the terminal recognizes that the touch gesture currently entered by the user on the fourth touch object is the area change gesture, if the pressure threshold for recognizing the pressure recognition gesture is increased in this case, the terminal may restore the pressure threshold to the default first pressure threshold of the terminal, for example, 2 N.

Therefore, when the user enters a touch gesture on a touch object (for example, a file of an application) again subsequently, if the touch object is the fourth touch object supporting the pressure recognition gesture and the area change gesture, the terminal may still repeat the foregoing steps S1901 to S1905 to recognize and respond to the touch gesture, to reduce a probability that the terminal incorrectly determines the area change gesture as the pressure recognition gesture.

In other embodiments of this application, when the finger of the user touches the fourth touch object, if the terminal can recognize, before the pressure value reaches the first pressure threshold (for example, 2 N), the touch intention of performing the area change gesture by the user, when the detected pressure value reaches the first pressure threshold 2 N for recognizing the pressure recognition gesture, without changing the first pressure threshold 2 N, the terminal may temporarily not report, to the application to which the fourth touch object belongs, that the gesture performed by the user is the pressure recognition gesture. In this case, the terminal may continue to determine whether the touch area detected before the pressure value reaches 3 N reaches the area threshold.

If the touch area reaches the area threshold, it indicates that the touch gesture performed by the user is the area change gesture. In this case, the terminal may further report the area change gesture to the application to which the fourth touch object belongs, to present the shortcut function corresponding to the area change gesture.

Correspondingly, if the touch area does not reach the area threshold, it indicates that the actual touch intention of the user is to perform the pressure recognition gesture. In this case, the terminal may further report the pressure recognition gesture to the application to which the fourth touch object belongs, to present a shortcut function corresponding to the pressure recognition gesture.

In addition, in this embodiment of this application, for a same touch object supporting different touch gestures, for example, the icon 901 of the WeChat application, the user may manually set the shortcut function triggered in different touch gestures. For example, the user may set a shortcut function "scanning QR code" triggered when entering the pressure recognition gesture on the icon 901, and set a shortcut function "account transfer" triggered when entering the touch-and-hold gesture on the icon 901. To be specific, because corresponding shortcut functions are defined for different touch gestures, customized touch experience can be implemented.

It should be noted that, one or more of the time threshold used by the terminal for recognizing the touch-and-hold gesture, the pressure threshold used for recognizing the pressure recognition gesture, and the area threshold used for recognizing the area change gesture may be preset before delivery of the terminal, or may be automatically generated or modified based on an operation habit of the user on the touchscreen, or may be obtained by the terminal from a server of a network side. This is not limited in this embodiment of this application.

It may be understood that, to implement the foregoing functions, the terminal includes corresponding hardware structures and/or software modules for performing the functions. A person skilled in the art should easily be aware that, in combination with the examples described in the embodiments disclosed in this specification, units, algorithms, and steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, functional modules in the terminal or the like may be defined according to the foregoing method examples. For example, each functional module may be defined in a correspondence to each function, or two or more functions may be integrated in one processing module. The integrated module may be implemented in a form of hardware, or may be implemented in a form of a software functional module. It should be noted that, in the embodiments of this application, module division is an example, and is merely logical function division. In actual implementation, another division manner may be used.

Figure 24:
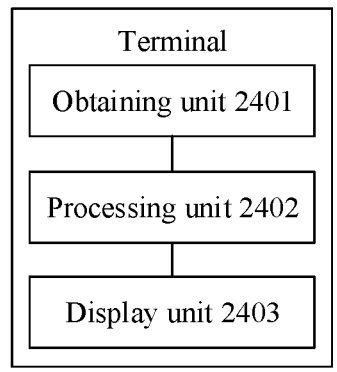
FIG. 24 is a schematic structural diagram 2 of a terminal according to an embodiment of this application.

An embodiment of the present invention further provides a terminal, configured to implement the method in each of the foregoing method embodiments. When each functional module is defined in a correspondence to each function, FIG. 24 shows a possible schematic structural diagram of the terminal in the foregoing embodiment. The terminal includes an obtaining unit 2401, a processing unit 2402, and a display unit 2403.

The obtaining unit 2401 is configured to support the terminal in performing steps 801 in FIG. 8A, steps 1301 in FIG. 13A, step 1801 in FIG. 18A, and step 1901 in FIG. 19A. The step unit 2402 is configured to support the terminal in performing a determining action between step 801 and 802, and step 802, 803, and 805 in FIG. 8A and FIG. 8B, a determining action between step 1301 and 1302, and step 1302, 1303, and 1305 in FIG. 13A and FIG. 13B, a determining action between steps 1801 and 1802, and step 1802, 1803, and 1805 in FIG. 18A and FIG. 18B, and a determining action between step 1901 and 1902, and step 1902, 1903, and 1905 in FIG. 19A and FIG. 19B. The display unit 2403 is configured to support the terminal in performing step 804 in FIG. 8B, step 1304 in FIG. 13B, step 1804a and 1804b in FIG. 18B, and step 1904 in FIG. 19B. All related content of steps in the foregoing method embodiments may be cited in function descriptions of corresponding functional modules. Details are not described again herein.

Figure 25:
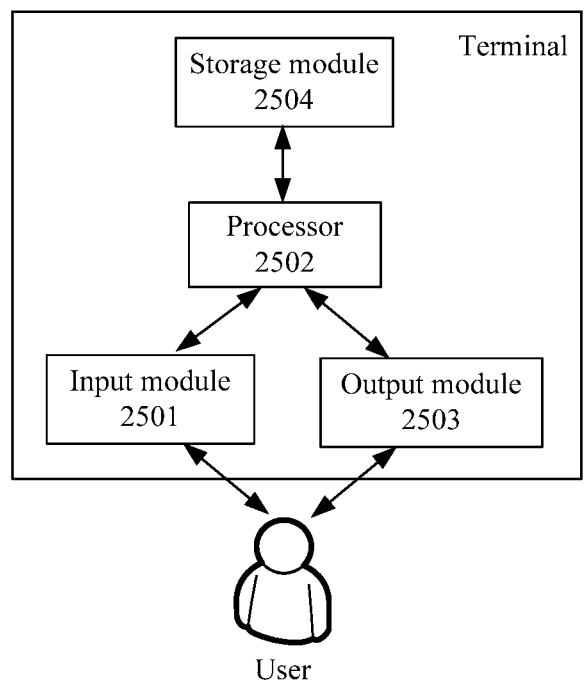
FIG. 25 is a schematic structural diagram 3 of a terminal according to an embodiment of this application.

When an integrated unit is used, an input module may be used as the obtaining unit 2401, a processing module is used as the processing unit 2402, and an output module is used as the display unit 2403. Certainly, the terminal may further include a storage module. In this case, FIG. 25 is a possible schematic structural diagram of a terminal in the foregoing embodiment.

The processing module 2502 is configured to control and manage an action of the terminal. The input module 2501 and the output module 2503 are configured to support interaction between the terminal and a user. The storage module 2504 is configured to store program code and data of the terminal.

For example, the processing module 2502 may be a processor or a controller, such as a central processing unit (Central Processing Unit, CPU), a GPU, a general-purpose processor, a digital signal processor (Digital Signal Processing, DSP), an application-specific integrated circuit (Application-Specific Integrated Circuit, ASIC), a field programmable gate array (Field Programmable Gate Array, FPGA), or another programmable logic device, a transistor logic device, a hardware component, or a combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor.

The storage module 2504 may be a memory, where the memory may include a high-speed random access memory (RAM), and may further include a non-volatile memory, for example, a magnetic disk storage device, a flash memory, or another non-volatile solid-state storage device.

The input module 2501 may be a device for receiving information entered by the user, such as a touchscreen or a microphone.

The output module 2503 may be a device for displaying information entered by the user, information provided to the user, and various menus of the terminal, such as a display (shown in FIG. 3). Specifically, the display may be configured in a form such as a liquid crystal display, or an organic light-emitting diode. In addition, the display may be further integrated with a touchpad, configured to capture a touch event on or near the touchpad, and send the captured touch information to another component (for example, a processor).

In addition, an embodiment of this application further provides an apparatus, where the apparatus may be specifically a chip, a component, or a module. The apparatus may include a processor and a memory that are connected, where the memory is configured to store a computer-executable instruction; and when the apparatus runs, the processor may execute the computer-executable instruction stored in the memory, so that the chip performs the touch method in each of the foregoing method embodiments.

All or some of the foregoing embodiments may be implemented by software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data centre to another website, computer, server, or data centre in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data centre, integrating one or more usable media. The usable medium may be a magnetic medium (for example, a floppy disk, a hard disk, or a magnetic tape), an optical medium (for example, a DVD), a semiconductor medium (for example, a solid-state drive, Solid State Disk (SSD), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
   receiving, by a terminal through a touchscreen, a first touch operation entered by a user on a second touch object, wherein the second touch object is a control element supporting an area change gesture and a touch-and-hold gesture;
   displaying, by the terminal in response to the first touch operation, a first interface corresponding to the area change gesture based on a touch area applied to the second touch object in the first touch operation meeting a first preset condition within a first time threshold, and reaching, within a second time threshold, an area threshold for recognizing the area change gesture, the second time threshold being greater than the first time threshold, and the second time threshold being greater than a time threshold for recognizing the touch-and-hold gesture by the terminal; and displaying, by the terminal in response to the first touch operation, a second interface corresponding to the touch-and-hold gesture based on the touch area applied to the second touch object in the first touch operation meeting the first preset condition within the first time threshold but not reaching the area threshold within the second time threshold or the touch area applied to the second touch object in the first touch operation not meeting the first preset condition within the first time threshold.

2. The method according to claim 1, wherein after the receiving, by the terminal, the first touch operation entered by the user on the second touch object, and after the displaying, by the terminal, the first interface corresponding to the area change gesture, the method further comprises:

obtaining, by the terminal, the touch area applied to the second touch object and a touch duration;

determining, by the terminal, that the touch area meets the first preset condition within the first time threshold, wherein the first time threshold is the time threshold for recognizing the touch-and-hold gesture by the terminal; and using, by the terminal, the second time threshold as the time threshold for recognizing the touch-and-hold gesture.

3. The method according to claim 2, wherein the using, by the terminal, the second time threshold as the time threshold for recognizing the touch-and-hold gesture comprises:

pre-storing, by the terminal, a correspondence between the second time threshold and the touch area, and using, by the terminal according to the correspondence, the second time threshold corresponding to the touch area as the time threshold for recognizing the touch-and-hold gesture; or pre-storing, by the terminal, a function relationship between the second time threshold and the touch area, substituting, by the terminal, the touch area into the function relationship to obtain the second time threshold, and using, by the terminal, the second time threshold as the time threshold for recognizing the touch-and-hold gesture.

4. The method according to claim 1, wherein the first preset condition comprises:

the touch area falls within a preset first area range, wherein an upper limit value of the preset first area range is less than the area threshold for recognizing the area change gesture, and a lower limit value of the preset first area range is greater than 0; and/or a growth rate of the touch area is greater than a preset rate threshold.

5. The method according to claim 4, wherein after the using, by the terminal, the second time threshold as the time threshold for recognizing the touch-and-hold gesture, the method further comprises:

in response to determining that the touch area meets a second preset condition within the second time threshold, using, by the terminal, a third time threshold as the time threshold for recognizing the touch-and-hold gesture, wherein the third time threshold is greater than the second time threshold, wherein the second preset condition comprises: the touch area falls within a preset second area range, wherein an upper limit value of the preset second area range is less than the area threshold for recognizing the area change gesture, and a lower limit value of the preset second area range is greater than the upper limit value of the preset first area range; and/or the growth rate of the touch area is greater than the preset rate threshold.

6. The method according to claim 4, wherein after the using, by the terminal, the second time threshold as the time threshold for recognizing the touch-and-hold gesture, the method further comprises:

when the second time threshold is a maximum time threshold for recognizing the touch-and-hold gesture, if the touch area meets a second preset condition, still using, by the terminal, the second time threshold as the time threshold for recognizing the touch-and-hold gesture.

7. A terminal, including:

a touchscreen;

a processor; and a memory storing computer-executable instructions, the computer-executable instructions, when executed by the processor, causing the processor to facilitate:

receiving, through the touchscreen, a first touch operation input by a user on a second touch object, the second touch object being a control element that supports an area change gesture and a touch-and-hold gesture;

displaying, using the touchscreen, in response to the first touch operation, a first interface corresponding to the area change gesture based on a touch area applied to the second touch object in the first touch operation meeting a first preset condition within a first time threshold, and reaching, within a second time threshold, an area threshold for recognizing the area change gesture, the second time threshold being greater than the first time threshold, and the second time threshold being greater than a time threshold for recognizing the touch-and-hold gesture by the terminal; and displaying, using the touchscreen, in response to the first touch operation, a second interface corresponding to the touch-and-hold gesture based on the touch area applied to the second touch object in the first touch operation meeting the first preset condition within the first time threshold but not reaching the area threshold within the second time threshold or the touch area applied to the second touch object in the first touch operation not meeting the first preset condition within the first time threshold.

8. The terminal according to claim 7, wherein after the receiving the first touch operation input by the user on the second touch object, and displaying the first interface corresponding to the area change gesture, the computer-executable instructions further cause the processor to facilitate:

acquiring a touch area and a touch duration that are applied to the second touch object;

determining, within the first time threshold, that the touch area meets the first preset condition, wherein the first time threshold is a time threshold for identifying the touch-and-hold gesture; and using the second time threshold as the time threshold for identifying the touch-and-hold gesture.

9. The terminal according to claim 8, wherein the first preset condition comprises:

the touch area falls within a preset first area range, an upper limit value of the preset first area range is less than an area threshold for identifying the area change gesture, and a lower limit value of the preset first area range is greater than 0; or, a growth rate of the touch area is greater than a preset speed threshold.

10. The terminal according to claim 9, wherein the computer-executable instructions further cause the processor to facilitate:

pre-storing a correspondence between the second time threshold and the touch area, and using, according to the correspondence, the second time threshold corresponding to the touch area as the time threshold for identifying the touch-and-hold gesture; or pre-storing a function relationship between the second time threshold and the touch area, substituting the touch area into the function relationship to obtain a second time threshold, and using the second time threshold as the time threshold for identifying the touch-and-hold gesture.

11. The terminal according to claim 10, wherein the computer-executable instructions further cause the processor to facilitate:

in response to a determination that the touch area meets a second preset condition within the second time threshold, using a third time threshold as the time threshold for identifying the touch-and-hold gesture, wherein the third time threshold is greater than the second time threshold, and wherein the second preset condition comprises: the touch area falls within a preset second area range, an upper limit value of the preset second area range is less than the area threshold for identifying the area change gesture, and a lower limit value of the preset second area range is greater than an upper limit value of the preset first area range; and; the growth rate of the touch area is greater than the preset speed threshold.

12. The terminal according to claim 10, wherein the computer-executable instructions further cause the processor to facilitate:

using the second time threshold as the time threshold for identifying the touch-and-hold gesture, when the second time threshold is a maximum time threshold for identifying the touch-and-hold gesture, and if the touch area meets a second preset condition.

13. A method, comprising:

receiving, by a terminal through a touchscreen, a first touch operation input by a user on a second touch object, wherein the second touch object is a control element that supports an area change gesture and a touch-and-hold gesture;

determining, by the terminal, an intention of the user according to an area and a time of contact between the first touch operation and the second touch object;

displaying, by the terminal, a first function when determining that the intention of the user is to display the first function corresponding to the area change gesture, wherein the first function is based on a touch area applied to the second touch object in the first touch operation meeting a first preset condition within a first time threshold, and reaching, within a second time threshold, an area threshold for recognizing the area change gesture, the second time threshold being greater than the first time threshold, and the second time threshold being greater than a time threshold for recognizing the touch-and-hold gesture by the terminal; and displaying, by the terminal, a second function when determining that the intention of the user is to display the second function corresponding to the touch-and-hold gesture, wherein the second function is based on the touch area applied to the second touch object in the first touch operation meeting the first preset condition within the first time threshold but not reaching the area threshold within the second time threshold or the touch area applied to the second touch object in the first touch operation not meeting the first preset condition within the first time threshold.

* * * * *